(12) United States Patent
Yamaguchi

(10) Patent No.: US 12,015,326 B2
(45) Date of Patent: Jun. 18, 2024

(54) MOTOR AND ELECTRIC DEVICE

(71) Applicant: Panasonic Intellectual Property Management Co., Ltd., Osaka (JP)

(72) Inventor: Akira Yamaguchi, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 17/601,556

(22) PCT Filed: Mar. 9, 2020

(86) PCT No.: PCT/JP2020/010039
§ 371 (c)(1),
(2) Date: Oct. 5, 2021

(87) PCT Pub. No.: WO2020/208988
PCT Pub. Date: Oct. 15, 2020

(65) Prior Publication Data
US 2022/0181946 A1    Jun. 9, 2022

(30) Foreign Application Priority Data

Apr. 11, 2019  (JP) ................................. 2019-075740

(51) Int. Cl.
| | |
|---|---|
| H02K 1/276 | (2022.01) |
| H02K 1/28 | (2006.01) |
| H02K 7/04 | (2006.01) |
| H02K 21/16 | (2006.01) |

(52) U.S. Cl.
CPC ............... *H02K 7/04* (2013.01); *H02K 1/276* (2013.01); *H02K 1/28* (2013.01); *H02K 21/16* (2013.01)

(58) Field of Classification Search
CPC .......... H02K 1/276; H02K 1/28; H02K 21/16
See application file for complete search history.

(56) References Cited

U.S. PATENT DOCUMENTS

| | | |
|---|---|---|
| 9,762,098 B2 | 9/2017 | Oketani et al. |
| 2013/0093279 A1 | 4/2013 | Yokota et al. |
| 2019/0386528 A1 | 12/2019 | Lee et al. |

FOREIGN PATENT DOCUMENTS

| | | | |
|---|---|---|---|
| CN | 106059149 A | | 10/2016 |
| CN | 116961274 A | * | 10/2023 |
| EP | 1983634 A2 | | 10/2008 |
| JP | 5-004739 U | | 1/1993 |
| JP | 8-088963 | | 4/1996 |
| JP | 3277780 B | | 4/2002 |

(Continued)

OTHER PUBLICATIONS

The Extended European Search Report dated Apr. 25, 2022 for the related European Patent Application No. 20788585.6.

(Continued)

*Primary Examiner* — Robert W Horn
(74) *Attorney, Agent, or Firm* — Rimon P.C.

(57) ABSTRACT

Provided is a motor including: a rotor having a rotor core provided with a magnet insertion hole and a permanent magnet disposed in the magnet insertion hole, the rotor rotating about its axis; a stator facing the rotor; and a fixing member fixing the permanent magnet in the magnet insertion hole. The fixing member includes a protrusion fitted in a gap between the rotor core and the permanent magnet.

19 Claims, 15 Drawing Sheets

(56) References Cited

FOREIGN PATENT DOCUMENTS

| JP | 3757434 B2 | 3/2006 | | |
|----|----|----|----|----|
| JP | 2007-181254 A | 7/2007 | | |
| JP | 2010-226882 A | 10/2010 | | |
| JP | 2011-147323 | 7/2011 | | |
| JP | 2013-051840 | 3/2013 | | |
| JP | 2013-090368 A | 5/2013 | | |
| JP | 2013-099038 | 5/2013 | | |
| JP | 2013-207817 A | 10/2013 | | |
| JP | 2017-063610 A | 3/2017 | | |
| KR | 20230076397 A * | 5/2023 | ............... | H02K 1/27 |
| WO | 2018/139791 A1 | 8/2018 | | |
| WO | WO-2018180634 A1 * | 10/2018 | ............... | H02K 1/27 |

OTHER PUBLICATIONS

International Search Report of PCT application No. PCT/JP2020/010039 dated Jun. 2, 2020.
The EPC Office Action dated Jan. 15, 2024 for the related European Patent Application No. 20788585.6.

* cited by examiner

MOTOR AND ELECTRIC DEVICE

TECHNICAL FIELD

The present disclosure relates to a motor and an electric device.

BACKGROUND ART

Motors are used in various electric devices. For example, an electric blower mounted in a vacuum cleaner uses a motor for rotating a rotary fan. As this type of motor, an interior permanent magnet (IPM) motor is known in which a rotor includes a rotor core with a permanent magnet embedded. The IPM motor can acquire not only magnet torque generated by the permanent magnet embedded in the rotor core, but also reluctance torque due to uneven magnitude of magnetic resistance generated in the rotor core. This enables fabricating a motor having a small size and high efficiency.

The rotor of the IPM motor includes the rotor core provided with a magnet insertion hole in which the permanent magnet is disposed. The permanent magnet disposed in the magnet insertion hole and the rotor core may be conventionally fixed with an adhesive. Known examples of a method of bonding and fixing a permanent magnet and a rotor core using an adhesive includes a method of disposing the permanent magnet in a magnet insertion hole and filling a gap between the permanent magnet and the rotor core with an adhesive. There is also a known method in which of a permanent magnet with an adhesive sheet bonded to its entire circumference is inserted into a magnet insertion hole (see PTL 1).

Unfortunately, fixing the permanent magnet and the rotor core with an adhesive requires a step (time) of curing the adhesive. This deteriorates work efficiency, so that productivity of the motor deteriorates. In particular, a small motor causes operation itself of injecting an adhesive into the magnet insertion hole to be difficult to be performed, so that fixing the permanent magnet using the adhesive greatly deteriorates productivity of the motor.

When a permanent magnet that is a sintered magnet is inserted into the magnet insertion hole by press-fitting, the permanent magnet may be broken. Thus, a gap (clearance) is provided as play between the permanent magnet disposed in the magnet insertion hole and the rotor core to prevent the permanent magnet from being broken when it is inserted into the magnet insertion hole.

Unfortunately, the gap existing between the permanent magnet disposed in the magnet insertion hole and the rotor core may cause a variation of a bonding and fixing position of the permanent magnet in the magnet insertion hole when an adhesive is injected into the gap to bond and fix the permanent magnet. The adhesive injected into each magnet insertion hole may vary in injection amount. As described above, when the bonding and fixing position of the permanent magnet and the injection amount of the adhesive vary, the rotor generates an imbalance of magnetic flux and vibration of the motor increases.

The present disclosure has been made to solve such a problem, and an object of the present disclosure is to provide a motor having low vibration and excellent productivity, and an electric device.

CITATION LIST

Patent Literature

PTL 1: Japanese Patent No. 3277780

SUMMARY OF THE INVENTION

To achieve the above object, a motor according to one aspect of the present disclosure includes: a rotor having a rotor core provided with a magnet insertion hole and a permanent magnet disposed in the magnet insertion hole, the rotor rotating about its axis; a stator facing the rotor; and a fixing member fixing the permanent magnet in the magnet insertion hole formed in the rotor core. The fixing member includes a protrusion fitted in a gap between the rotor core and the permanent magnet.

The permanent magnet is preferably in contact with an inner surface of the magnet insertion hole, being located outward, of inner surfaces included in the magnet insertion hole, when viewed from a direction in which the axis extends.

The fixing member may be a balance weight.

The permanent magnet preferably has a plate shape, and includes a first magnet side surface on one side in a width direction of the permanent magnet, a second magnet side surface on another side in the width direction of the permanent magnet, a first magnet main surface on one side in a thickness direction of the permanent magnet, and a second magnet main surface on another side in the thickness direction of the permanent magnet. The magnet insertion hole preferably has surfaces serving as inner surfaces of the rotor core, the surfaces including: a first hole main surface located inward in a radial direction intersecting the axis of the rotor core; a first hole side surface on one lateral side of the magnet insertion hole; a second hole side surface on another lateral side of the magnet insertion hole; and a second hole main surface located outward in the radial direction intersecting the axis of the rotor core. The permanent magnet is preferably disposed in the magnet insertion hole while the first magnet main surface is located inward of the second magnet main surface in the radial direction of the axis of the rotor core. When the rotor is viewed from the direction in which the axis extends, the gap preferably includes a first gap between the first magnet side surface and the first hole side surface, a second gap between the second magnet side surface and the second hole side surface, and a third gap between the first magnet main surface and the first hole main surface.

The first gap and the second gap may be each a flux barrier.

The fixing member preferably has protrusions including a first protrusion fitted into the first gap and a second protrusion fitted into the second gap.

When the rotor is viewed from the direction in which the axis extends, the permanent magnet may have a trapezoidal shape. The permanent magnet has an outer side in a radial direction of the rotor core that may be larger than its inner side in the radial direction of the rotor core.

The protrusion is preferably fitted in the third gap.

The rotor core may be provided with a recess that is recessed stepwise from an opening surface of the magnet insertion hole as a part of the third gap. The protrusion may be fitted into the recess.

When the rotor is viewed from the direction in which the rotor extends, the third gap and the protrusion each may have an elongated shape along the first magnet main surface of the permanent magnet.

The rotor preferably includes a shaft passing through the rotor core. The fixing member is preferably provided with a through-hole through which the shaft passes. The fixing member preferably faces a surface of the shaft in its axial direction.

The motor may include, as the fixing member, a first fixing member facing one surface in the axial direction of the shaft and a second fixing member facing another surface in the axial direction of the shaft.

The magnet insertion hole may be one of multiple magnet insertion holes provided along a circumferential direction of the rotor core. The permanent magnet may be one of multiple permanent magnets disposed in the respective magnet insertion holes. The protrusion may be one of multiple protrusions provided corresponding to the respective permanent magnets.

The fixing member is preferably made of a non-magnetic material.

The non-magnetic material is preferably a thermoplastic resin.

The rotor core and the permanent magnet are each preferably harder than the protrusion.

An electric device according to one aspect of the present disclosure includes any one of the motors described above.

The present disclosure enables the permanent magnet to be fixed to the rotor core at a predetermined position in the magnet insertion hole without using an adhesive even when a gap exists between the permanent magnet disposed in the magnet insertion hole and the rotor core. Thus, a motor having low vibration and excellent productivity, and an electric device including the motor, can be fabricated.

DESCRIPTION OF EMBODIMENT

Figure 1:
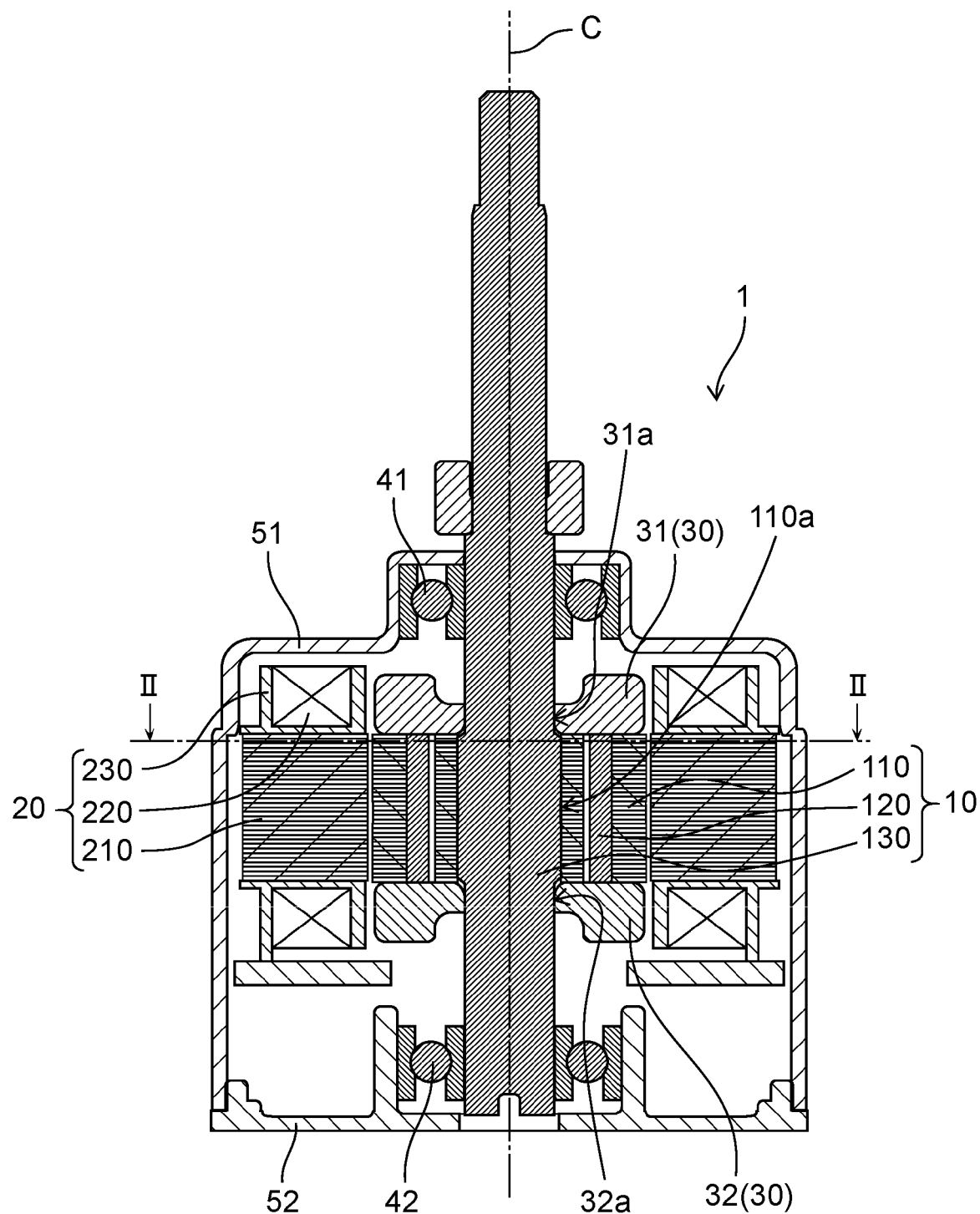
FIG. 1 is a sectional view of a motor according to an exemplary embodiment.

Hereinafter, an exemplary embodiment of the present disclosure will be described. The following exemplary embodiment illustrates a specific example of the present disclosure. Thus, numerical values, components, placement positions and connection forms of the components, steps, order of the steps, and the like, which are described in the following exemplary embodiment, are illustrative and are not to limit the scope of the present disclosure. The following exemplary embodiment includes components in which a component, which is not described in the independent claim showing the highest concept of the present disclosure, is described as an optional component.

Each drawing is a schematic diagram, and is not necessarily strictly illustrated. In each drawing, substantially the same components are denoted by the same reference numerals to eliminate or simplify duplicated description.

EXEMPLARY EMBODIMENT

Figure 2:
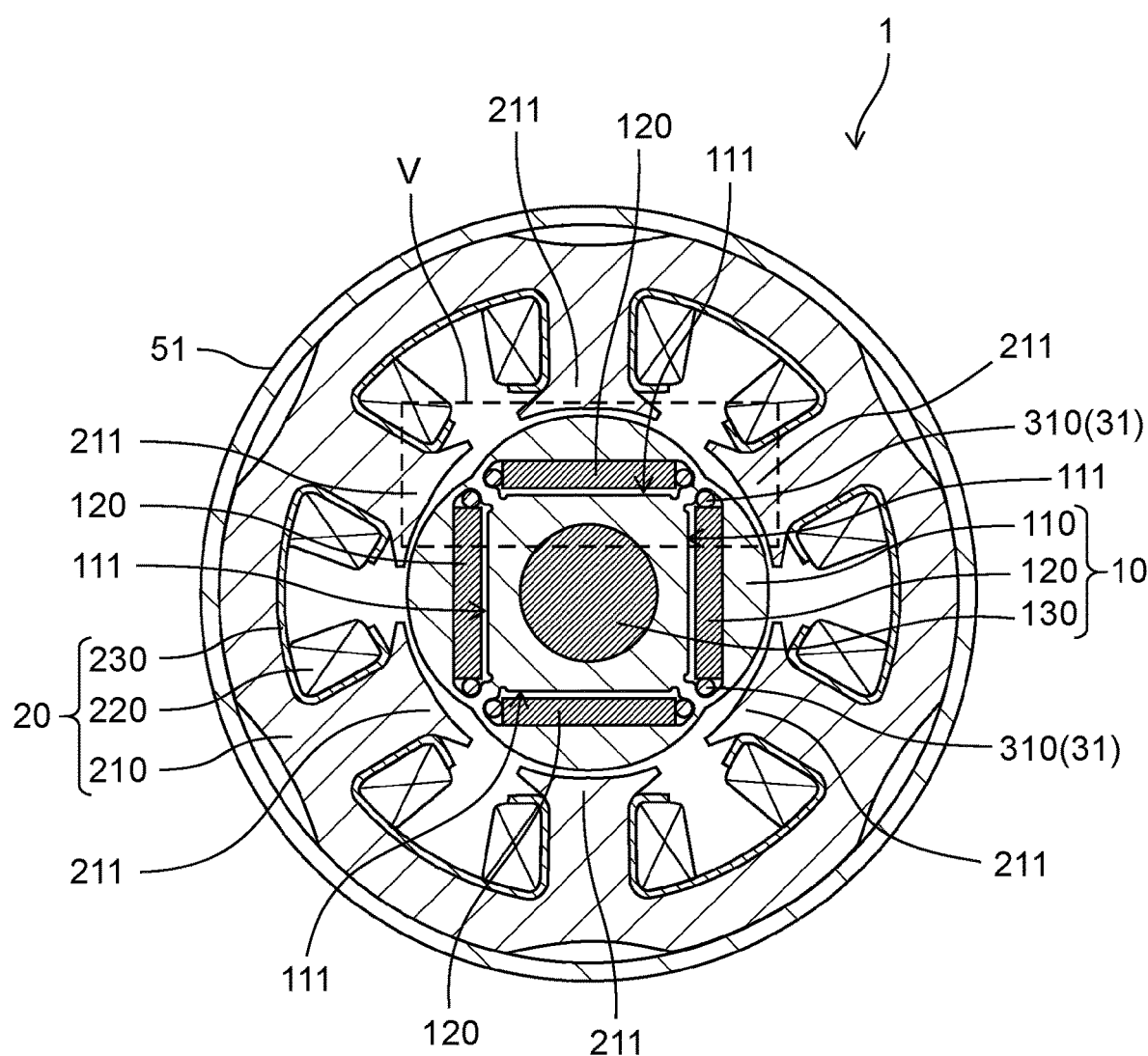
FIG. 2 is a sectional view of the motor taken along line II-II in FIG. 1.

First, general structure of motor 1 according to an exemplary embodiment will be described with reference to FIGS. 1 and 2. FIG. 1 is a sectional view of motor 1 according to the exemplary embodiment. FIG. 2 is a sectional view of motor 1 taken along line II-II in FIG. 1. Motor 1 according to the present exemplary embodiment can be used as, for example, a fan motor of an electric blower mounted in a vacuum cleaner.

As illustrated in FIGS. 1 and 2, motor 1 includes rotor 10, stator 20, and fixing member 30. Motor 1 further includes first bearing 41, second bearing 42, first bracket 51, and second bracket 52.

Motor 1 according to the present exemplary embodiment is an electric motor of an inner rotor type in which rotor 10 is disposed inside stator 20. That is, stator 20 is disposed surrounding rotor 10. Stator 20 faces rotor 10.

Rotor 10 (rotator) is disposed inside stator 20 with a minute air gap from stator 20. Rotor 10 is configured to have N-poles and S-poles that are repeatedly present in its circumferential direction. Rotor 10 rotates about axis C using magnetic force generated in stator 20. Rotor 10 includes rotor core 110, permanent magnet 120, and shaft 130.

Rotor core 110 is a layered body in which multiple steel plates are layered in a direction of axis C (axial direction) of shaft 130. Each of the multiple steel sheets is, for example, a punched electromagnetic steel sheet having a predetermined shape. The multiple steel sheets are fixed to each other by crimping, for example.

Permanent magnet 120 is composed of a sintered magnet. Permanent magnet 120 is embedded in rotor core 110. That is, motor 1 is an IPM motor including rotor 10 in which permanent magnet 120 is embedded in rotor core 110. Multiple permanent magnets 120 are embedded in rotor core 110.

Shaft 130 (rotating shaft) is, for example, a metal rod, and extends along axis C. Shaft 130 is fixed to rotor core 110. Shaft 130 is inserted in through-hole 110a provided at the center of rotor core 110 and extends on both sides of rotor core 110 in the axial direction. Shaft 130 is fixed to rotor core 110 by, for example, press-fitting or shrink-fitting into through-hole 110a of rotor core 110.

Rotor 10 configured as described above rotates about axis C of shaft 130. That is, shaft 130 serves as a center when rotor 10 rotates. Details of rotor 10 will be described later.

Stator 20 (stator) is disposed surrounding rotor 10 with a minute air gap from rotor 10. Stator 20 generates magnetic force acting on rotor 10. Stator 20 includes stator core 210 (stator core), winding coil 220, and insulator 230.

Stator core 210 is a layered body in which multiple steel plates are layered in the direction of axis C of shaft 130. Each of the multiple steel sheets is, for example, a punched electromagnetic steel sheet having a predetermined shape. Stator core 210 is not limited to the layered body, and may be a bulk body made of a magnetic material. As illustrated in FIG. 2, stator core 210 is provided with multiple teeth 211 protruding toward rotor core 110 of rotor 10. Multiple teeth 211 are disposed at equal intervals in the circumferential direction while forming a slot, which is an opening portion, between each other.

Winding coil 220 is a stator coil, and is wound around each of the multiple teeth 211 provided in stator core 210 with insulator 230 interposed therebetween. Each winding coil 220 is composed of unit coils of three phases of U-phase, V-phase, and W-phase that are electrically different from each other by 120 degrees. That is, winding coil 220 wound around each of teeth 211 is energized and driven by three-phase alternating current energized in units of phases of the U-phase, the V-phase, and the W-phase.

Insulator 230 is made of an insulating resin material, and teeth 211 of the stator core 210 are covered with insulator 230. Insulator 230 is provided on each of teeth 211.

Fixing member 30 fixes permanent magnet 120 to rotor core 110. Permanent magnet 120 is held by rotor core 110 by being fixed to rotor core 110 by fixing member 30. Fixing member 30 is attached to shaft 130. Thus, fixing member 30 rotates together with rotor core 110 as shaft 130 rotates.

In the present exemplary embodiment, fixing member 30 is a balance weight for adjusting a weight balance of rotor 10. That is, permanent magnet 120 is fixed to rotor core 110 using an existing balance weight. The balance weight is an adjustment member for adjusting a weight balance of rotor 10 by cutting out a part of an outer peripheral portion of the balance weight by cutting processing or the like. Using the balance weight enables rotor 10 to be rotated with a good balance about shaft 130 (rotating shaft) while eliminating eccentricity of rotor 10.

In the present exemplary embodiment, first fixing member 31 and second fixing member 32 are each disposed as fixing member 30. First fixing member 31 faces one surface of rotor core 110 in the axial direction of shaft 130. In contrast, second fixing member 32 faces the other surface of rotor core 110 in the axial direction of shaft 130. In other words, rotor core 110 is sandwiched between first fixing member 31 and second fixing member 32. This allows each permanent magnet 120 to be fixed to rotor core 110 by being sandwiched between first fixing member 31 and second fixing member 32. First fixing member 31 and second fixing member 32 are in contact with rotor core 110.

First fixing member 31 is provided with through-hole 31a through which shaft 130 passes. Similarly, second fixing member 32 is provided with through-hole 32a through which shaft 130 passes. Although first fixing member 31 and second fixing member 32 are fixed to shaft 130 by press fitting, for example, a method for fixing first fixing member 31 and second fixing member 32 to shaft 130 is not limited thereto. Detailed structure of first fixing member 31 and second fixing member 32 will be described later.

First bearing 41 and second bearing 42 rotatably hold shaft 130. First bearing 41 supports a portion of shaft 130, protruding from one side of rotor core 110. Second bearing 42 supports a portion of shaft 130, protruding from the other side of rotor core 110. Although ball bearings are used as first bearing 41 and second bearing 42, other bearings such as thrust bearings can also be used.

First bracket 51 holds first bearing 41. Specifically, first bearing 41 is fixed to a recess provided in first bracket 51. Second bracket 52 holds second bearing 42. Specifically, second bearing 42 is fixed to a recess provided in second bracket 52. First bracket 51 and second bracket 52 are each made of, for example, a metal material.

First bracket 51 and second bracket 52 constitute an outline of motor 1. Specifically, first bracket 51 is a frame (housing) having an opening portion. Second bracket 52 is a lid that closes the opening portion of first bracket 51.

Shaft 130 passes through first bracket 51. Apart of shaft 130 protrudes outward from first bracket 51. Although not illustrated, a load such as a rotary fan is attached to a portion of shaft 130, protruding outward from first bracket 51. That is, shaft 130 has a portion protruding from first bracket 51, the portion serving as an output shaft.

When winding coil 220 of stator 20 is energized in motor 1 configured as described above, a field current flows through winding coil 220, and a magnetic flux is generated in stator 20 (stator core 210). The magnetic flux of stator 20 and a magnetic flux generated from permanent magnet 120 provided in rotor 10 interact with each other to generate magnetic force that serves as torque for rotating rotor 10, and then rotor 10 rotates.

Figure 3:
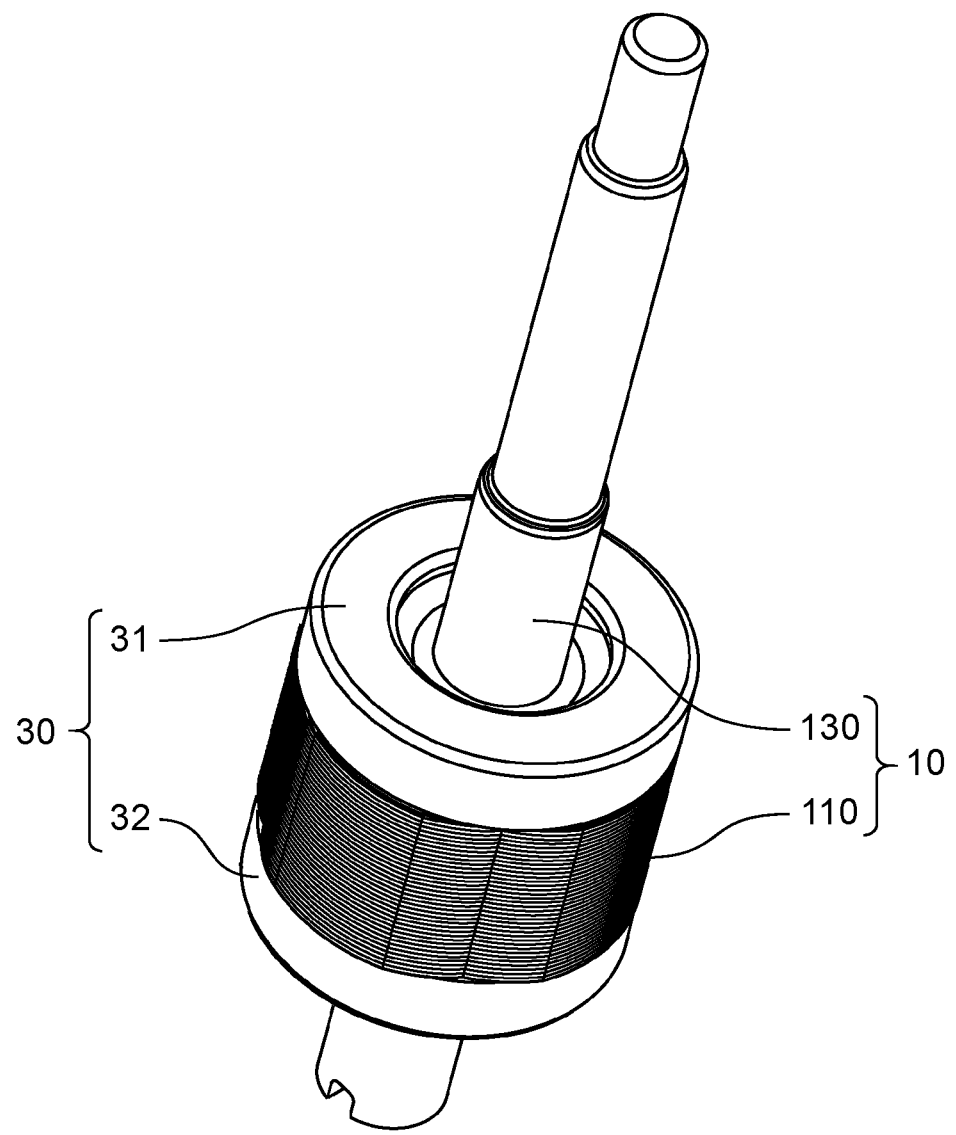
FIG. 3 is a perspective view of a rotor and a fixing member used in the motor according to the exemplary embodiment.
Figure 4:
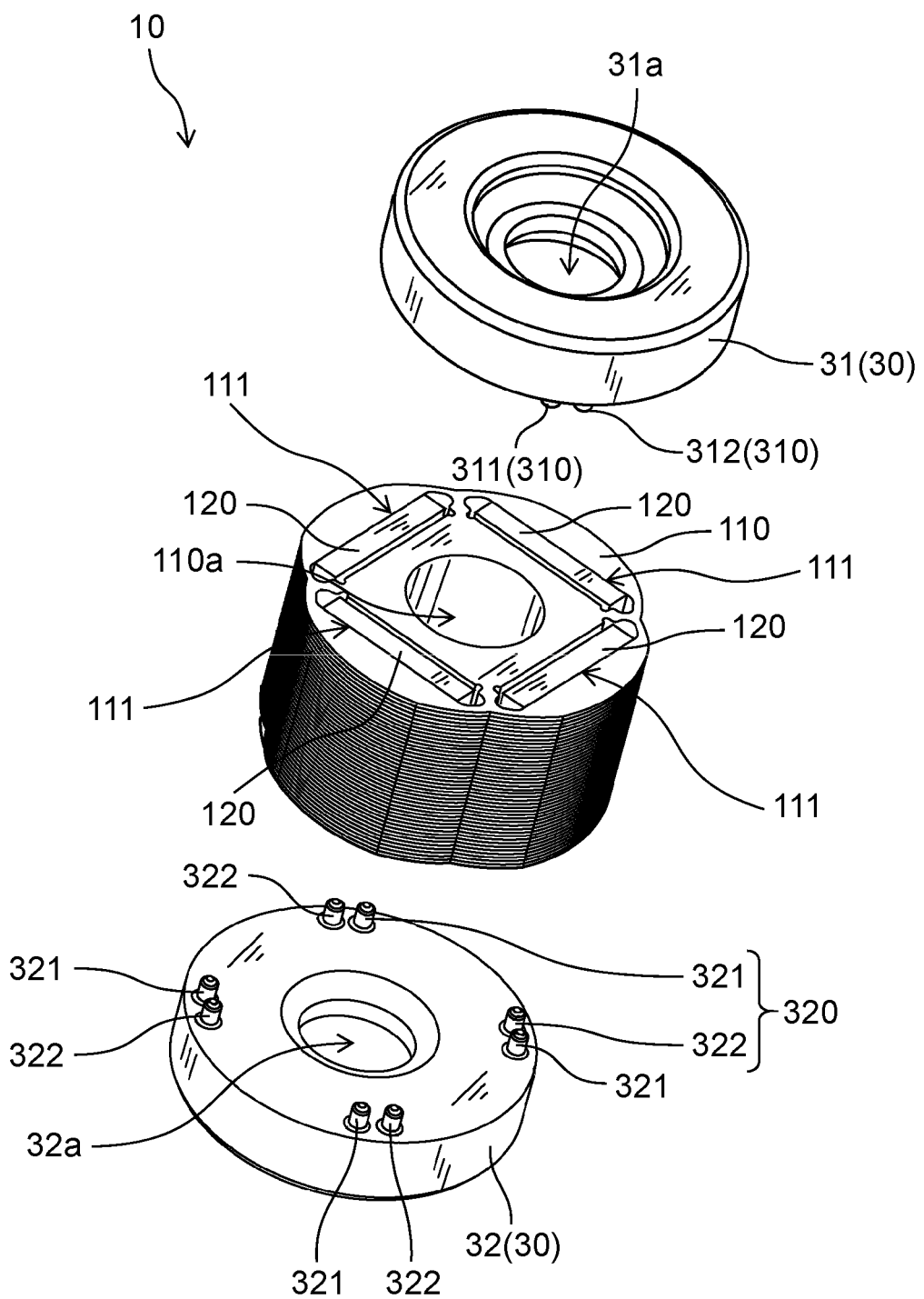
FIG. 4 is an exploded perspective view of the rotor and the fixing member used in the motor according to the exemplary embodiment.
Figure 5:
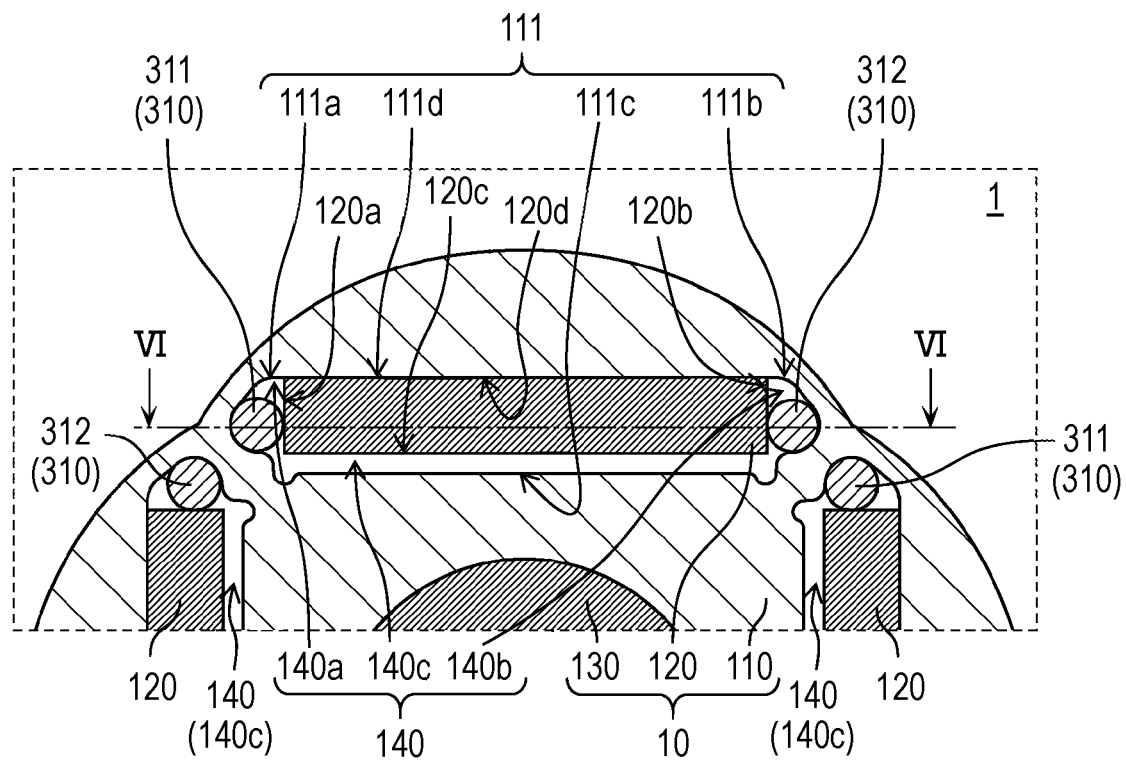
FIG. 5 is a partially enlarged sectional view of the rotor used in the motor according to the exemplary embodiment.
Figure 6:
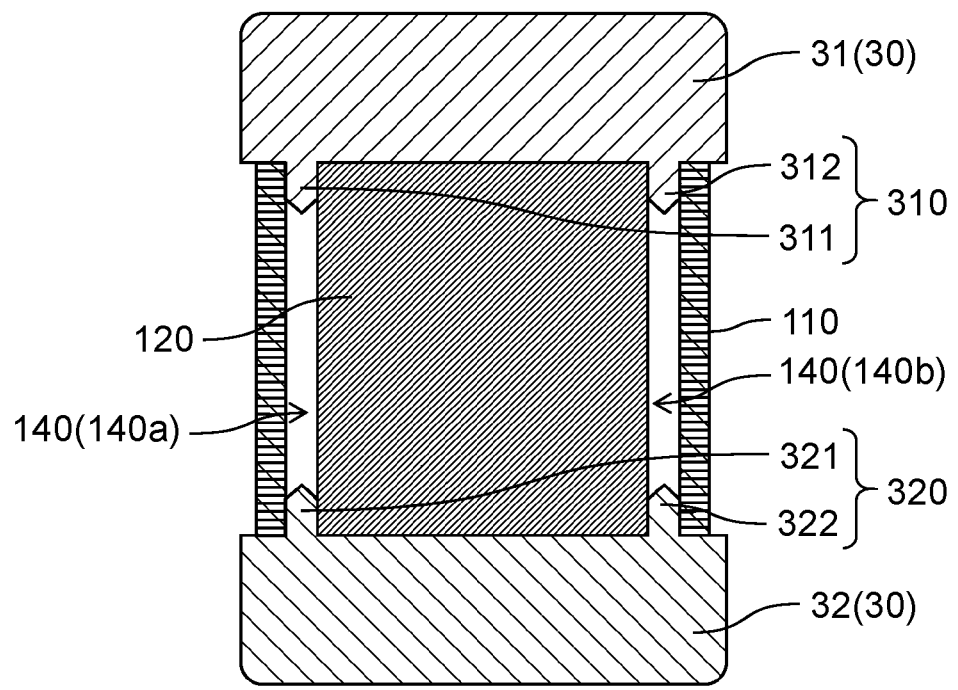
FIG. 6 is a sectional view of the rotor taken along line VI-VI in FIG. 5.

Next, detailed structure of rotor 10 and fixing member 30 in motor 1 according to the present exemplary embodiment will be described with reference to not only FIGS. 1 and 2 but also FIGS. 3 to 6. FIG. 3 is a perspective view of rotor 10 and fixing member 30 used in motor 1 according to the exemplary embodiment. FIG. 4 is an exploded perspective view of rotor 10 and fixing member 30 used in motor 1. FIG. 5 is a partially enlarged sectional view of rotor 10. FIG. 6 is a sectional view of rotor 10 taken along line VI-VI in FIG. 5. In FIG. 4, shaft 130 is eliminated. FIG. 5 illustrates only rotor 10 in an enlarged manner in region V enclosed by a broken line in FIG. 2.

As described above, rotor 10 includes rotor core 110, permanent magnet 120 embedded in rotor core 110, and shaft 130 inserted in through-hole 110a of rotor core 110.

As illustrated in FIGS. 1, 2, and 4 to 6, multiple magnet insertion holes 111 are formed in rotor core 110 as magnet embedded holes in which respective permanent magnets 120 are embedded. Multiple magnet insertion holes 111 are provided along a circumferential direction of rotor core 110. Specifically, multiple magnet insertion holes 111 are provided in an inner portion near an outer peripheral surface of rotor core 110 at equal intervals along a rotation direction of rotor core 110. Four magnet insertion holes 111 are provided. Four magnet insertion holes 111 are disposed forming a regular polygon (a square in the present exemplary embodiment) in top view.

Each magnet insertion hole 111 is a through-hole passing through rotor core 110 along a longitudinal direction (direction of axis C) of shaft 130. Thus, each magnet insertion hole 111 is opened at both end surfaces of rotor core 110 in the longitudinal direction of shaft 130. Each magnet insertion hole 111 has openings each having a slit shape, for example. Each magnet insertion hole 111 has a section take along an arbitrary plane with a normal line in the longitudinal direction of shaft 130, the section having a slit shape being identical to the opening.

Each magnet insertion hole 111 has surfaces as inner surfaces of rotor core 110 in magnet insertion hole 111, the surfaces including: first hole side surface 111a on one lateral side of magnet insertion hole 111; second hole side surface 111b on the other lateral side of magnet insertion hole 111; first hole main surface 111c located inward in a radial direction of rotor core 110 (radial direction of rotor 10); and second hole main surface 111d located outward in the radial direction of rotor core 110.

Permanent magnet 120 is disposed in each of multiple magnet insertion holes 111. One permanent magnet 120 is inserted in each magnet insertion hole 111. Rotor core 110 is provided with four magnet insertion holes 111, so that four permanent magnets 120 are embedded in rotor core 110. Multiple permanent magnets 120 are disposed at equal intervals along the circumferential direction of rotor core 110 as with multiple magnet insertion holes 111. Each permanent magnet 120 is magnetized, and permanent magnets 120 are disposed such that a S-pole and an N-pole, which are each a magnetic pole, are alternately present in a circumferential direction of rotor 10. This allows rotor 10 to have multiple magnetic poles at equal intervals along the circumferential direction of rotor core 110. Permanent magnet 120 may be magnetized after permanent magnet 120 is disposed in magnet insertion hole 111, or may be magnetized in advance before permanent magnet 120 is inserted into magnet insertion hole 111. However, considering workability of inserting permanent magnet 120 into magnet insertion hole 111, permanent magnet 120 is preferably magnetized after being inserted into magnet insertion hole 111.

Each permanent magnet 120 has a plate shape. Permanent magnet 120 is a rectangular parallelepiped in the shape of a thin plate shape, and has a rectangular shape in plan view. Thus, permanent magnet 120 has a section taken along a plane with a normal line in the longitudinal direction of shaft 130, the section having a rectangular shape.

The permanent magnet 120 having a plate shape includes first magnet side surface 120a on one side in a width direction of permanent magnet 120, second magnet side surface 120b on the other side in the width direction of permanent magnet 120, first magnet main surface 120c on one side in a thickness direction of permanent magnet 120, and second magnet main surface 120d on the other side in the thickness direction of permanent magnet 120.

Each permanent magnet 120 is disposed in magnet insertion hole 111 to have a thickness direction in the radial direction of rotor core 110. Specifically, each permanent magnet 120 is disposed in magnet insertion hole 111 such that first magnet main surface 120c is located inward of second magnet main surface 120d in the radial direction of rotor core 110. Thus, each permanent magnet 120 has first magnet main surface 120c located radially inside in rotor core 110, and second magnet main surface 120d located radially outside in rotor core 110.

Each permanent magnet 120 is disposed in magnet insertion hole 111 to be close to the radially outside (outer periphery) of rotor core 110. Each permanent magnet 120 is in contact with an inner surface of the magnet insertion hole 111, being located radially outward in rotor core 110. Specifically, second magnet main surface 120d of permanent magnet 120 is in surface contact with second hole main surface 111d of magnet insertion hole 111.

In each magnet insertion hole 111, gap 140 (clearance) exists between rotor core 110 and permanent magnet 120 when permanent magnet 120 is disposed in magnet insertion hole 111. In the present exemplary embodiment, gap 140 includes first gap 140a between first magnet side surface 120a and first hole side surface 111a, second gap 140b between second magnet side surface 120b and second hole side surface 111b, and third gap 140c between first magnet main surface 120c and first hole main surface 111c.

First gap 140a and second gap 140b of gap 140 are each a flux barrier (magnetic barrier) for preventing magnetic flux leakage. That is, first gap 140a and second gap 140b each have a function of reducing or blocking passage of a magnetic flux generated by permanent magnet 120 disposed in magnet insertion hole 111. Third gap 140c is a slit-like gap having a width of 0.2 mm or less, for example. Third gap 140c has a width of 0.05 mm.

First fixing member 31 includes protrusion 310 to be fitted into gap 140 between rotor core 110 and permanent magnet 120. Permanent magnet 120 can be fixed to rotor core 110 when protrusion 310 of first fixing member 31 is fitted into gap 140. That is, protrusion 310 of first fixing member 31 has a shape and size that allow protrusion 310 to be press-fitted into gap 140. This enables permanent magnet 120 to be fixed to rotor core 110 using reaction force caused when protrusion 310 of first fixing member 31 is pressed into gap 140 by press fitting.

First fixing member 31 includes, as protrusion 310, first protrusion 311 fitted in first gap 140a of gap 140 and second protrusion 312 fitted in second gap 140b of gap 140. That is, first protrusion 311 and second protrusion 312 are fitted using first gap 140a and second gap 140b that each serve as a flux barrier, and permanent magnet 120 is fixed to rotor core 110 by being sandwiched between a pair of first protrusion 311 and second protrusion 312. As an example, first protrusion 311 is fitted into first gap 140a by light press fitting. Second protrusion 312 is fitted into second gap 140b by light press fitting.

First protrusion 311 and second protrusion 312 of first fixing member 31 are, for example, each a bullet-shaped protrusion formed protruding from a disk-shaped base portion (weight portion) of first fixing member 31 toward rotor core 110.

Multiple protrusions 310 of first fixing member 31 are provided corresponding to respective permanent magnets 120. That is, multiple protrusions 310 are provided corresponding to respective magnet insertion holes 111. The pair of first protrusion 311 and second protrusion 312 is fitted in one magnet insertion hole 111. Thus, first fixing member 31 is provided with as many pairs of first protrusion 311 and second protrusion 312 as magnet insertion holes 111 provided in rotor core 110. Four magnet insertion holes 111 are provided in the present exemplary embodiment, so that four pairs of first protrusion 311 and second protrusion 312 are also provided. That is, first fixing member 31 is provided with four first protrusions 311 and four second protrusions 312.

As with first fixing member 31, second fixing member 32 includes protrusion 320 fitted in gap 140 between rotor core 110 and permanent magnet 120. Permanent magnet 120 can be fixed to rotor core 110 when protrusion 320 of second fixing member 32 is fitted into gap 140. That is, protrusion 320 of second fixing member 32 has a shape and size that allow protrusion 320 to be press-fitted into gap 140. This enables permanent magnet 120 to be fixed to rotor core 110 using reaction force caused when protrusion 320 of second fixing member 32 is pressed into gap 140 by press fitting.

Second fixing member 32 includes, as protrusion 320, first protrusion 321 fitted in first gap 140a of gap 140 and second protrusion 322 fitted in second gap 140b of gap 140. That is, first protrusion 321 and second protrusion 322 are fitted using first gap 140a and second gap 140b that each serve as a flux barrier, and permanent magnet 120 is fixed to rotor core 110 by being sandwiched between a pair of first protrusion 321 and second protrusion 322. As an example, first protrusion 321 is fitted into first gap 140a by light press fitting. Second protrusion 322 is fitted into second gap 140b by light press fitting.

First protrusion 321 and second protrusion 322 of second fixing member 32 are, for example, each a bullet-shaped protrusion formed protruding from a disk-shaped base portion (weight portion) of second fixing member 32 toward rotor core 110.

As with protrusion 310 of first fixing member 31, multiple protrusions 320 of second fixing member 32 are provided corresponding to respective permanent magnets 120 and magnet insertion holes 111. The pair of first protrusion 321 and second protrusion 322 is fitted in one magnet insertion hole 111. Thus, second fixing member 32 is provided with as many pairs of first protrusion 321 and second protrusion 322 as magnet insertion holes 111 provided in rotor core 110. Four magnet insertion holes 111 are provided in the present exemplary embodiment, so that four pairs of first protrusion 321 and second protrusion 322 are also provided. That is, as with first fixing member 31, second fixing member 32 is also provided with four first protrusions 321 and four second protrusions 322.

Protrusion 320 (first protrusion 321, second protrusion 322) of second fixing member 32 is fitted into gap 140 from a side opposite to protrusion 310 (first protrusion 311, second protrusion 312) of first fixing member 31. That is, in the present exemplary embodiment, permanent magnet 120 is fixed to rotor core 110 by first fixing member 31 and second fixing member 32 sandwiching rotor core 110. Specifically, first fixing member 31 fixes an end of permanent magnet 120 on one side in the longitudinal direction of shaft 130. Second fixing member 32 fixes the other end of permanent magnet 120 in the longitudinal direction of shaft 130.

First fixing member 31 and second fixing member 32 each have a circular shape in top view. First fixing member 31 and second fixing member 32 each have an outer diameter that is substantially equal to an outer diameter of rotor core 110.

First fixing member 31 and second fixing member 32 are each preferably made of a non-magnetic material such as resin or metal (aluminum, brass, stainless steel, and the like). First fixing member 31 and second fixing member 32 may be each made of a composite of resin and metal. For example, the weight portions of first fixing member 31 and second fixing member 32 may be made of resin, and metal pins may be used as protrusion 310 and protrusion 320. In this case, for example, first fixing member 31 and second fixing member 32 can be manufactured by insert molding. First fixing member 31 and second fixing member 32 are entirely made of a thermoplastic resin. That is, both the base portions of first fixing member 31 and second fixing member 32, and protrusions 310 and 320, are made of the thermoplastic resin.

Protrusion 310 of first fixing member 31 and protrusion 320 of second fixing member 32 each preferably have a hardness smaller than a hardness of each of rotor core 110 and permanent magnet 120. That is, protrusion 310 of first fixing member 31 and protrusion 320 of second fixing member 32 are each preferably made of a material softer than rotor core 110 and permanent magnet 120. The hardness of protrusion 310 of first fixing member 31 and the hardness of protrusion 320 of second fixing member 32 can be represented by, for example, an elastic modulus or Vickers hardness.

First fixing member 31 and second fixing member 32 are identical in shape and material. That is, first fixing member 31 and second fixing member 32 are each the same resin molded component.

As described above, motor 1 according to the present exemplary embodiment includes: rotor 10 having rotor core 110 provided with magnet insertion hole 111 and permanent magnet 120 disposed in magnet insertion hole 111, rotor 10 rotating about its axis; stator 20 facing rotor 10; and fixing member 30 fixing permanent magnet 120 in magnet insertion hole 111. Fixing member 30 includes protrusion 310 fitted in gap 140 between rotor core 110 and permanent magnet 120. Stator 20 according to the present exemplary embodiment includes stator core 210 in which multiple steel plates are layered, multiple teeth 211 provided in stator core 210 and protruding toward rotor core 110, and winding coil 220 wound around each of multiple teeth 211.

This configuration enables permanent magnet 120 to be fixed to rotor core 110 at a predetermined position in magnet insertion hole 111 without using an adhesive even when gap 140 exists between permanent magnet 120 disposed in magnet insertion hole 111 and rotor core 110. As described above, motor 1 according to the present exemplary embodiment enables permanent magnet 120 to be fixed without using an adhesive. Thus, motor 1 is improved in productivity. Additionally, using no adhesive enables reducing the amount of imbalance of the rotor due to a variation in a bonded and fixed position of permanent magnet 120 and a variation in the amount of injection of an adhesive, so that vibration of motor 1 can be reduced. Thus, motor 1 having low vibration and excellent productivity can be fabricated.

Motor 1 according to the present exemplary embodiment includes first fixing member 31 that is provided with through-hole 31a through which shaft 130 passes, and first fixing member 31 faces the surface of rotor core 110 in the direction of axis C of shaft 130.

This configuration enables first fixing member 31 to be inserted onto shaft 130 to face the surface of rotor core 110 in the direction of axis C of shaft 130, and enables first fixing member 31 to be fixed to shaft 130. This enables permanent magnet 120 to be more reliably fixed by first fixing member 31 fixed to shaft 130.

As illustrated in FIG. 3, motor 1 according to the present exemplary embodiment includes, as fixing member 30, first fixing member 31 facing one surface of rotor core 110 in the direction of axis C of shaft 130 and second fixing member 32 facing the other surface of rotor core 110 in the direction of axis C of shaft 130.

This configuration enables permanent magnet 120 inserted into magnet insertion hole 111 to be fixed while rotor core 110 is sandwiched between first fixing member 31 and second fixing member 32. As a result, permanent magnet 120 can be fixed while being sandwiched between first fixing member 31 and second fixing member 32 in the direction of axis C of shaft 130. Thus, permanent magnet 120 can be more reliably fixed to rotor core 110.

Motor 1 according to the present exemplary embodiment includes permanent magnet 120 that is in contact with the inner surface located outward in the radial direction of rotor core 110 of the inner surfaces included in magnet insertion hole 111 when viewed from the direction in which axis C extends. Specifically, second magnet main surface 120d of permanent magnet 120 and second hole main surface 111*d* of magnet insertion hole 111 are brought into surface contact with each other.

This configuration enables permanent magnet 120 to be located outside in magnet insertion hole 111 in an initial state. Thus, deterioration of performance characteristics of permanent magnet 120 due to positional displacement can be prevented. This point will be described below.

When rotor 10 (rotor core 110) rotates, centrifugal force acts on permanent magnet 120 disposed in magnet insertion hole 111 of rotor core 110. Thus, when a gap exists around permanent magnet 120 in magnet insertion hole 111, permanent magnet 120 is likely to move radially outward in magnet insertion hole 111. At this time, if permanent magnet 120 is located radially inward in magnet insertion hole 111, even permanent magnet 120 fixed by fixing member 30 may be displaced radially outward by the centrifugal force due to rotation of rotor 10. As a result, multiple permanent magnets 120 each embedded in rotor core 110 may vary in fixed position in magnet insertion hole 111. In contrast, when permanent magnet 120 is preliminarily located radially outward in magnet insertion hole 111 in the initial state as in the present exemplary embodiment, even the centrifugal force acting on permanent magnet 120 cannot further move permanent magnet 120 radially outward. This enables preventing a variation in fixed position of permanent magnet 120 in magnet insertion hole 111. Thus, deterioration of the performance characteristics of permanent magnet 120 due to positional displacement can be prevented.

Fixing member 30 according to the present exemplary embodiment is a balance weight. Specifically, first fixing member 31 and second fixing member 32 are each a balance weight.

This enables permanent magnet 120 to be fixed to rotor core 110 using the balance weight. That is, first fixing member 31 and second fixing member 32 each in the present exemplary embodiment have a function of adjusting balance of the rotor and a function of fixing permanent magnet 120. Thus, permanent magnet 120 can be fixed to rotor core 110 without adding a fixing member only for fixing permanent magnet 120. Imbalance of rotor 10 can be reduced by partially cutting first fixing member 31 and second fixing member 32, which are each a balance weight, to correct the amount of imbalance of rotor 10. Thus, motor 1 having further lower vibration can be fabricated.

Motor 1 according to the present exemplary embodiment is configured such that permanent magnet 120 is fixed by fixing member 30 using a flux barrier provided in magnet insertion hole 111. Specifically, when rotor 10 is viewed from above, gap 140 includes first gap 140*a* between first magnet side surface 120*a* of permanent magnet 120 and first hole side surface 111*a* of magnet insertion hole 111, second gap 140*b* between second magnet side surface 120*b* of permanent magnet 120 and second hole side surface 111*b* of magnet insertion hole 111, and third gap 140*c* between first magnet main surface 120*c* of permanent magnet 120 and first hole main surface 111*c* of magnet insertion hole 111. First gap 140*a* and second gap 140*b* are each a flux barrier. First fixing member 31 includes, as protrusion 310, first protrusion 311 fitted in first gap 140*a* serving as a flux barrier, and second protrusion 312 fitted in second gap 140*b* serving as a flux barrier. Similarly, second fixing member 32 includes, as protrusion 320, first protrusion 321 fitted in first gap 140*a* serving as a flux barrier and second protrusion 322 fitted in second gap 140*b* serving as a flux barrier.

When protrusion 310 of first fixing member 31 and protrusion 320 of second fixing member 32 are fitted using first gap 140*a* and second gap 140*b* that are each a flux barrier, as described above, permanent magnet 120 can be fixed to rotor core 110 without an adhesive and without separately forming a gap, a recess, or the like in rotor core 110, only for fitting protrusion 310 of first fixing member 31 and protrusion 320 of second fixing member 32. This enables permanent magnet 120 to be fixed at low cost.

Motor 1 according to the present exemplary embodiment includes first fixing member 31 and second fixing member 32 that are each made of a non-magnetic material.

This configuration enables permanent magnet 120 to be fixed by first fixing member 31 and second fixing member 32 without affecting performance of rotor 10.

Specifically, a thermoplastic resin is used as the non-magnetic material. That is, first fixing member 31 and second fixing member 32 are made of the thermoplastic resin.

This configuration enables protrusion 310 of first fixing member 31 and protrusion 320 of second fixing member 32 to have appropriate elastic force, so that protrusion 310 of first fixing member 31 and protrusion 320 of second fixing member 32 can be elastically deformed when being fitted into gap 140. This enables protrusion 310 and protrusion 320 to absorb stress when protrusion 310 and protrusion 320 are fitted into gap 140 between rotor core 110 and permanent magnet 120 in magnet insertion hole 111. Thus, even when protrusion 310 and protrusion 320 are fitted into gap 140 by press fitting, a crack or the like can be prevented from occurring in rotor core 110 and permanent magnet 120, and thus motor 1 with high reliability can be fabricated.

Motor 1 according to the present exemplary embodiment includes rotor core 110 and permanent magnet 120 that are each preferably harder than protrusion 310 of first fixing member 31 and protrusion 320 of second fixing member 32.

Event this case enables protrusion 310 and protrusion 320 to absorb stress when protrusion 310 and protrusion 320 are fitted into gap 140 between rotor core 110 and permanent magnet 120 in magnet insertion hole 111, so that motor 1 with high reliability can be fabricated.

(First Modification)

Figure 7:
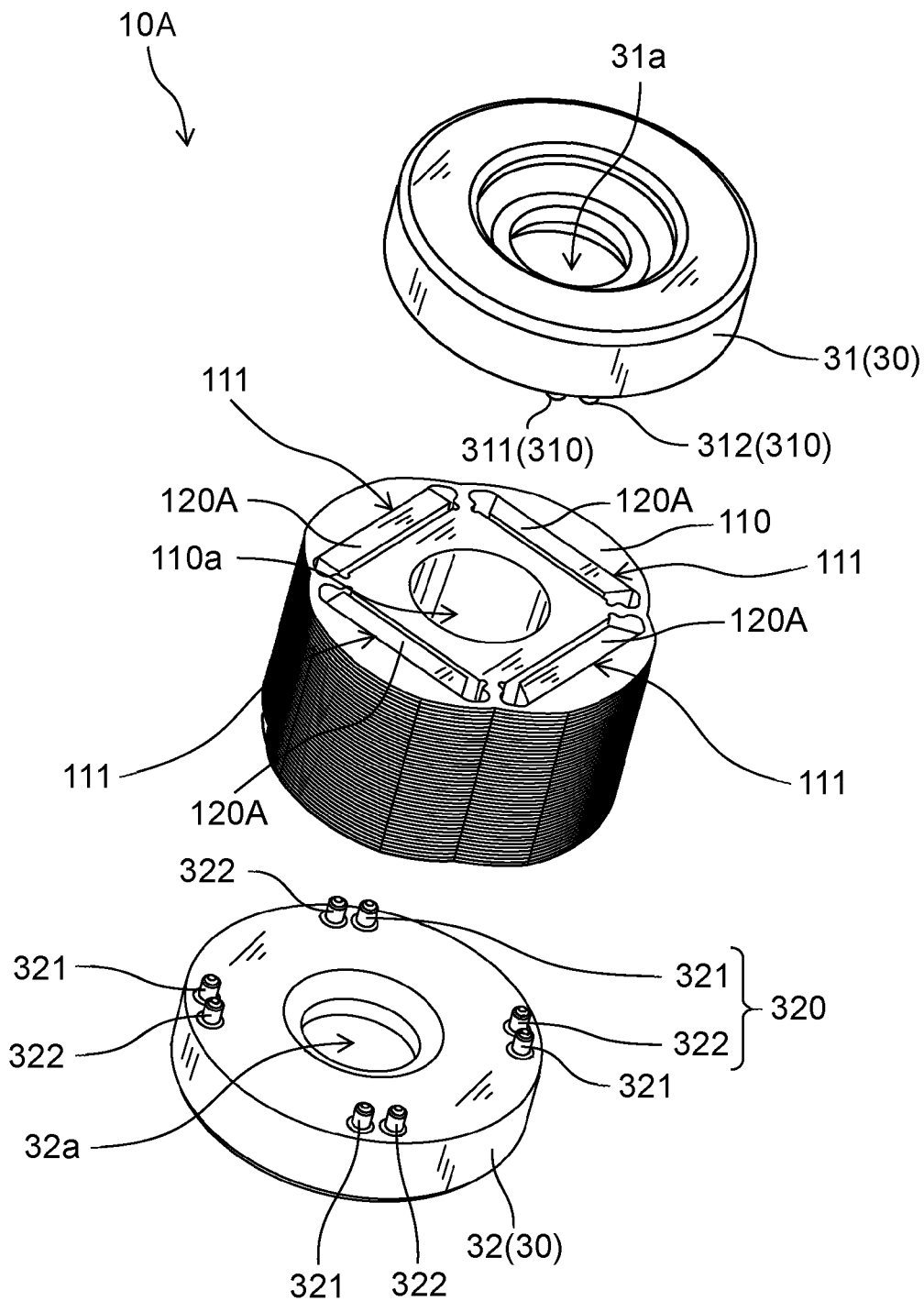
FIG. 7 is an exploded perspective view of a rotor and a fixing member used in a motor according to a first modification.
Figure 8:
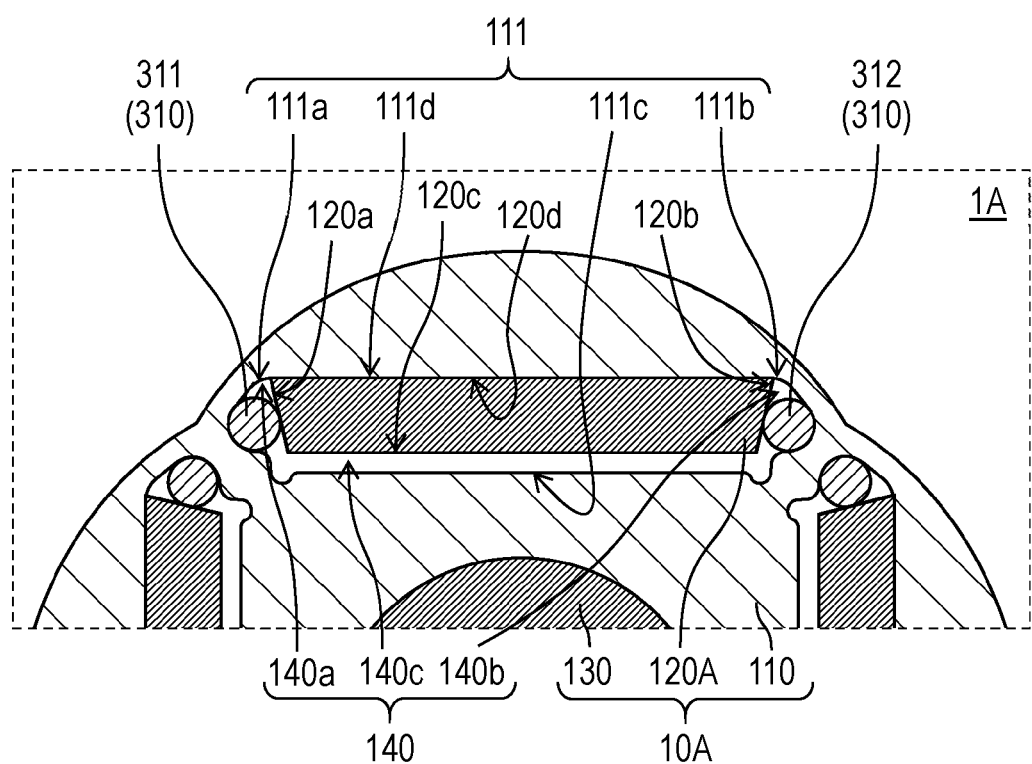
FIG. 8 is a partially enlarged sectional view of a rotor used in the motor according to the first modification.

Next, motor 1A according to a first modification will be described with reference to FIGS. 7 and 8. FIG. 7 is an exploded perspective view of rotor 10A and fixing member 30 used in motor 1A according to the first modification. FIG. 8 is a partially enlarged sectional view of rotor 10A used in motor 1A.

Motor 1A according to the present modification is different from motor 1 in the exemplary embodiment described above in that permanent magnet 120A is different in shape from permanent magnet 120. Specifically, although motor 1 in the exemplary embodiment described above includes permanent magnet 120 that has a rectangular shape when rotor 10 is viewed from above, motor 1A in the present modification includes permanent magnet 120A that has a trapezoidal shape when rotor 10A is viewed from above, as illustrated in FIG. 7. That is, permanent magnet 120A in the present modification has a sectional shape that is a trapezoid as illustrated in FIG. 8. The present modification has the same configuration as that of motor 1 in the exemplary embodiment described above except for permanent magnet 120A.

As illustrated in FIGS. 7 and 8, permanent magnet 120A in the present modification is disposed in magnet insertion hole 111 of rotor core 110 while a side located radially outward in rotor core 110 in permanent magnet 120A is larger than a side located radially inward in rotor core 110 in permanent magnet 120A. That is, each permanent magnet 120A having a trapezoidal shape, in which its upper base is defined as a short side and its lower base is defined as a long side, is disposed in magnet insertion hole 111 while having the long side located radially outward (outer peripheral side) in rotor core 110 and the short side located radially inward in rotor core 110.

Figure 9:
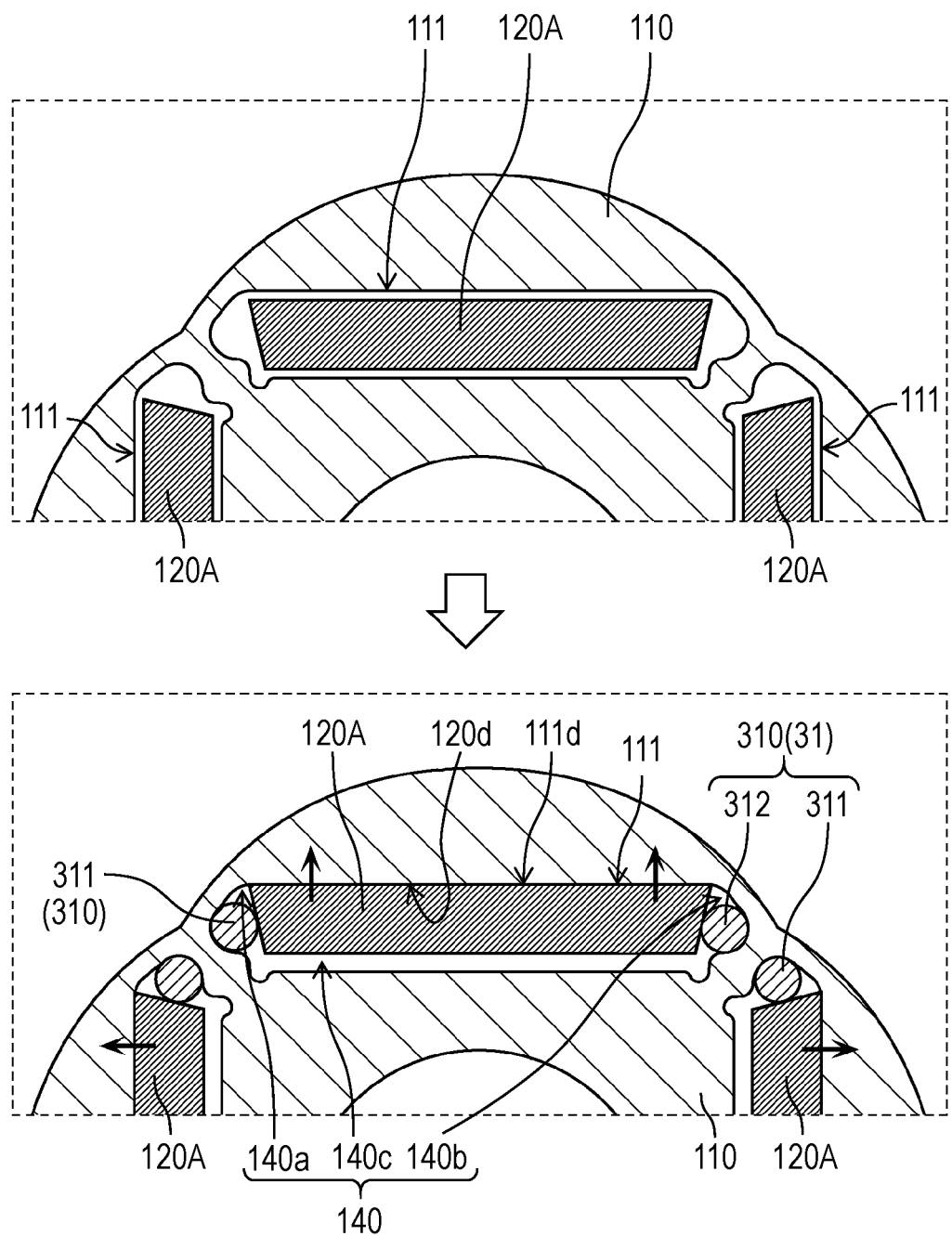
FIG. 9 is a diagram illustrating a state when a permanent magnet is assembled to a rotor core in the motor according to the first modification.

This configuration enables permanent magnet 120A to be located in magnet insertion hole 111 on its outer peripheral side by self-alignment when permanent magnet 120A disposed in magnet insertion hole 111 is fixed by fixing member 30. This point will be described with reference to FIG. 9. FIG. 9 is a diagram illustrating a state when permanent magnet 120A is assembled to rotor core 110 in motor 1A according to the first modification. Although FIG. 9 illustrates only first fixing member 31 of fixing member 30, the same applies to second fixing member 32.

As illustrated in an upper part of FIG. 9, permanent magnet 120A is first inserted into each magnet insertion hole 111 of rotor core 110, and permanent magnet 120A is disposed in each magnet insertion hole 111. At this time, magnet insertion hole 111 has play, so that permanent magnet 120A can be easily inserted into magnet insertion hole 111. Thus, a gap exists around permanent magnet 120A disposed in magnet insertion hole 111.

Next, as illustrated in a lower part of FIG. 9, first fixing member 31 is assembled to rotor core 110 such that protrusion 310 is fitted into gap 140. Specifically, first protrusion 311 of first fixing member 31 is fitted into first gap 140a and second protrusion 312 of first fixing member 31 is fitted into second gap 140b by press fitting.

At this time, first protrusion 311 is pressed into first gap portion 140a while being in contact with one side surface of permanent magnet 120A in a trapezoidal shape, and second protrusion 312 is pressed into second gap portion 140b while being in contact with the other side surface of permanent magnet 120A in a trapezoidal shape. At this time, permanent magnet 120A receives stress from first protrusion 311 and second protrusion 312, and then automatically moves radially outward in rotor core 110. That is, permanent magnet 120A can be located in magnet insertion hole 111 on its outer peripheral side only by fitting protrusion 310 (first protrusion 311, second protrusion 312) into gap 140. Specifically, each permanent magnet 120A can be brought into contact with an inner surface of magnet insertion hole 111, being located radially outward in rotor core 110. That is, permanent magnet 120A is naturally positioned in magnet insertion hole 111 such that second magnet main surface 120d of permanent magnet 120A and second hole main surface 111d of magnet insertion hole 111 come into surface contact with each other only by fitting protrusion 310 (first protrusion 311, second protrusion 312) into gap 140.

Permanent magnet 120A is formed in a trapezoidal shape, so that erroneous insertion can be prevented when permanent magnet 120A is inserted into magnet insertion hole 111. This enables eliminating an error of a magnetization direction of permanent magnet 120A due to erroneous insertion.

(Second Modification)

Figure 10:
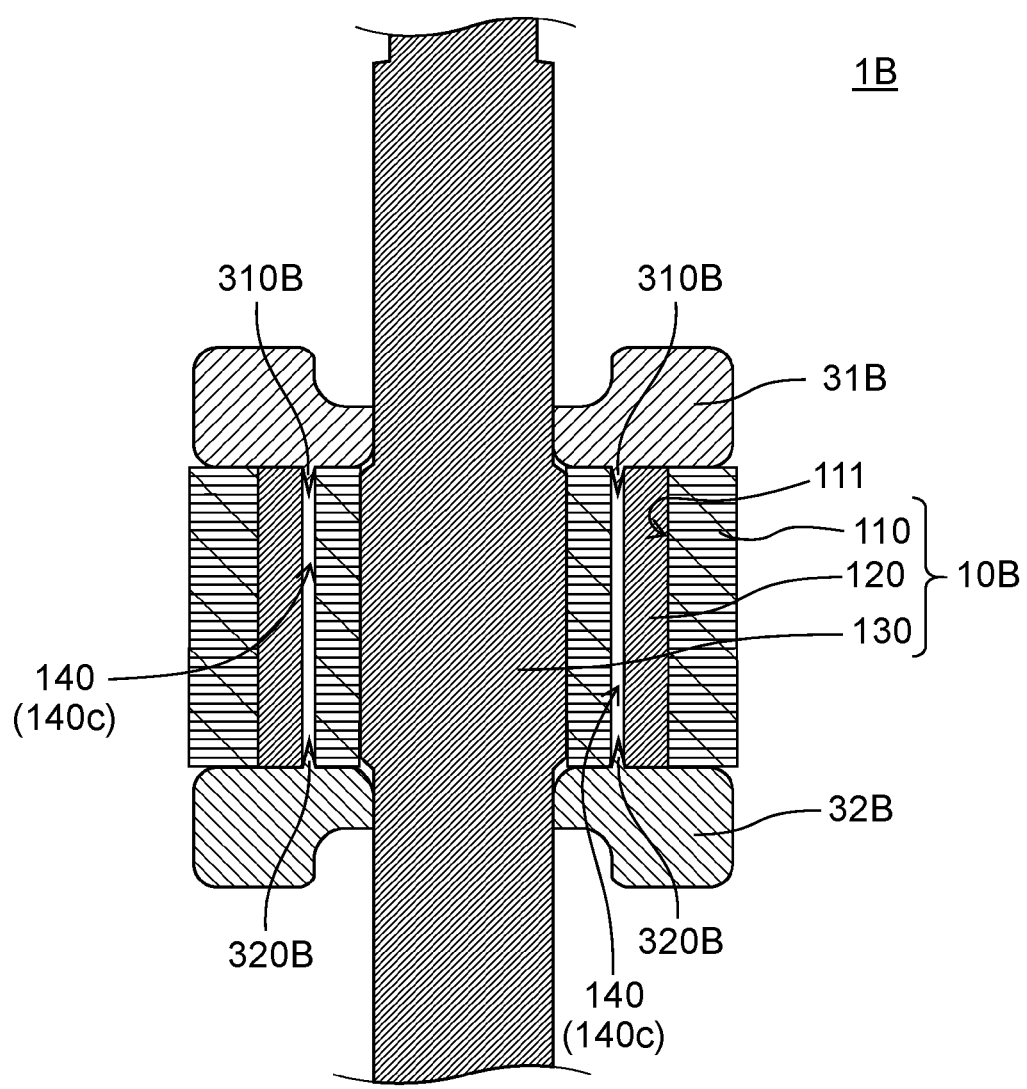
FIG. 10 is a partially enlarged sectional view of a rotor used in a motor according to a second modification.
Figure 11:
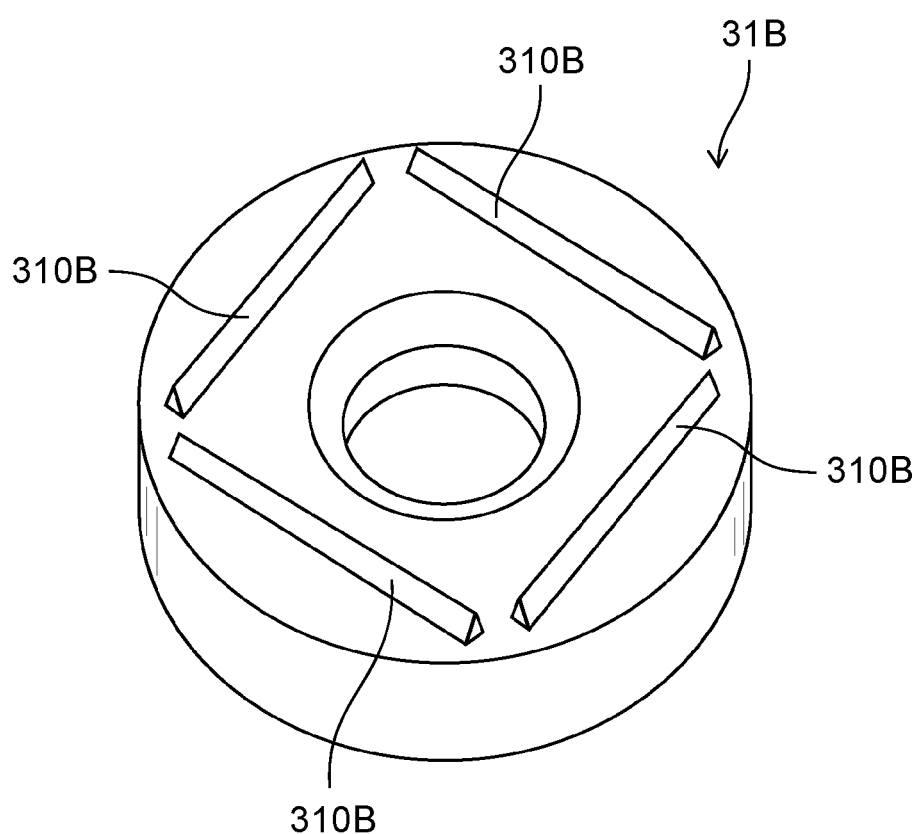
FIG. 11 is a perspective view of a first fixing member used in the motor according to the second modification.

Next, motor 1B according to a second modification will be described with reference to FIGS. 10 and 11. FIG. 10 is a partially enlarged sectional view of rotor 10B used in motor 1B according to the second modification. FIG. 11 is a perspective view of first fixing member 31B used in motor 1B. In FIG. 10, components other than rotor 10B, first fixing member 31B, and second fixing member 32B are eliminated.

Motor 1B according to the present modification is different from motor 1 in the exemplary embodiment described above in configurations of first fixing member 31B and second fixing member 32B.

Specifically, motor 1 according to the exemplary embodiment described above includes protrusion 310 of first fixing member 31 and protrusion 320 of second fixing member 32 that are each a bullet-shaped protrusion. In contrast, as illustrated in FIGS. 10 and 11, motor 1B according to the present modification includes protrusion 310B of first fixing member 31B and protrusion 320B of second fixing member 32B that are each an elongated shape along first magnet main surface 120c of permanent magnet 120 when rotor 10B is viewed from above. Specifically, as illustrated in FIG. 11, protrusion 310B of first fixing member 31B is in the shape of a triangular prism extending along a long side of permanent magnet 120. Second fixing member 32B is identical in shape to first fixing member 31B, so that protrusion 32B of second fixing member 320B is also in the shape of a triangular prism extending along the long side of permanent magnet 120.

Motor 1B according to the present modification is different from motor 1 in the exemplary embodiment described above in the position of gap 140 into which protrusion 310B of first fixing member 31B and protrusion 320B of second fixing member 32B are fitted.

Specifically, the motor according to the exemplary embodiment described above includes protrusion 310 of first fixing member 31 and protrusion 320 of second fixing member 32 that are fitted into first gap 140a and second gap 140b of gap 140. As illustrated in FIG. 10, motor 1B according to the present modification includes protrusion 310B of first fixing member 31B and protrusion 320B of second fixing member 32B that are fitted into third gap 140c of gap 140.

The present modification has the same configuration as that of motor 1 in the exemplary embodiment described above except for first fixing member 31B and second fixing member 32B.

As described above, even motor 1B according to the present modification enables permanent magnet 120 disposed in magnet insertion hole 111 of rotor core 110 to be fixed to rotor core 110 by first fixing member 31B and second fixing member 32B.

This configuration enables permanent magnet 120 to be fixed to rotor core 110 at a predetermined position in magnet insertion hole 111 without using an adhesive even when gap 140 exists between permanent magnet 120 disposed in magnet insertion hole 111 and rotor core 110. Thus, motor 1B having low vibration and excellent productivity can be fabricated.

The present modification includes protrusion 310B of first fixing member 31B and protrusion 320B of second fixing member 32B that are fitted into third gap 140c. Unfortunately, third gap 140c is a narrow region having a width of 0.2 mm or less. Thus, protrusion 310B and the protrusion 320B are also narrowed in width, so that protrusion 310B and protrusion 320B may decrease in mechanical strength depending on materials of protrusion 310B and the protrusion 320B. This may reduce holding force of permanent magnet 120 using protrusion 310B and protrusion 320B. In contrast, when third gap 140c is increased in entire width, third gap 140c, which is originally not desired to function as a flux barrier, serves as the flux barrier. As a result, magnetic flux of rotor 10 may be greatly reduced, and performance of motor 1 may be deteriorated.

Figure 12:
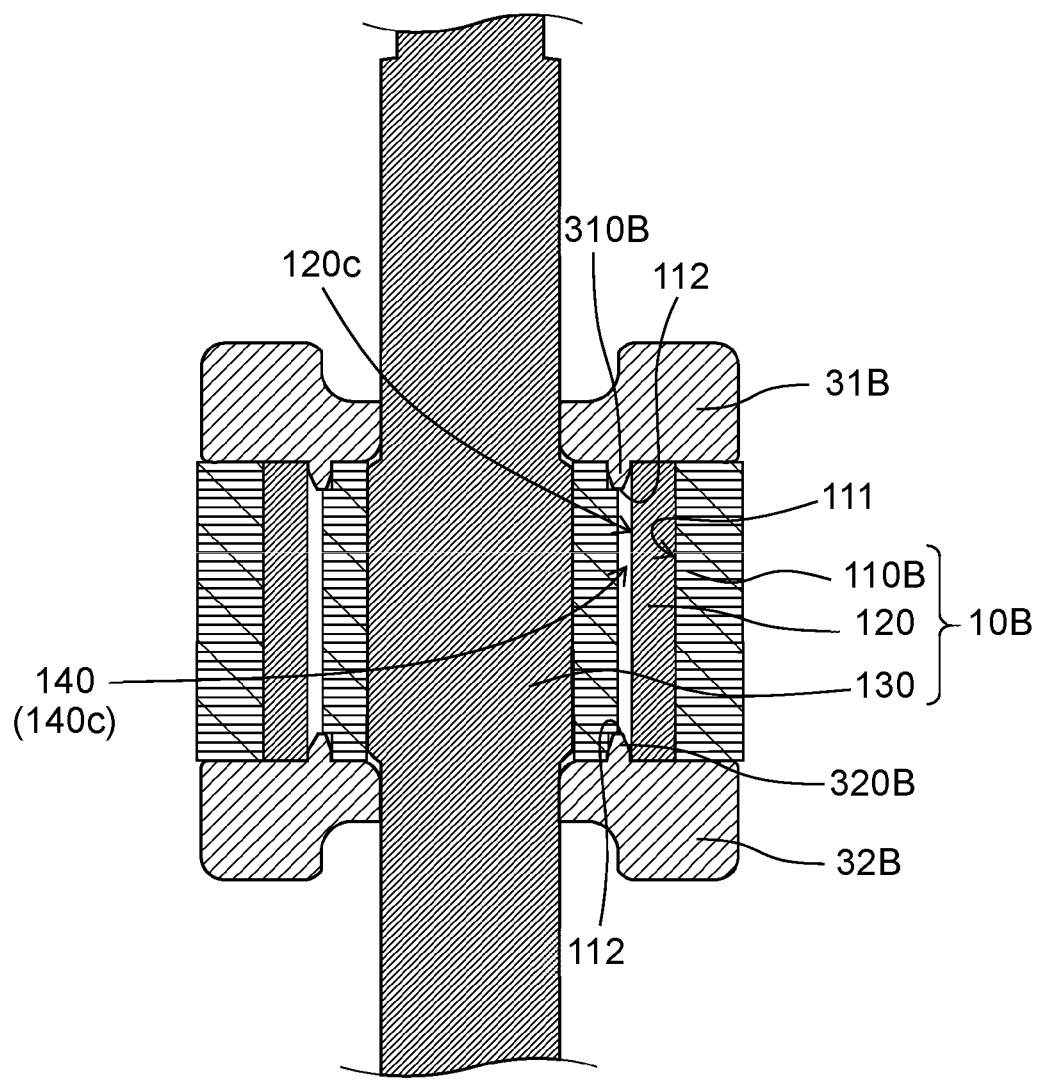
FIG. 12 is a sectional view of a rotor used in another motor according to the second modification.

Thus, as illustrated in FIG. 12, third gap portion 140c only near an opening portion of magnet insertion hole 111 is preferably increased in width to increase a width of each of protrusion 310B and protrusion 320B. FIG. 12 is a sectional view of rotor 10B used in another motor according to the second modification. Specifically, as with rotor 10B illustrated in FIG. 12, rotor core 110B is preferably provided with recess 112 having a width larger than a width of third gap 140c. Recess 112 is formed as a part of third gap 140c by being recessed stepwise from an opening surface of magnet insertion hole 111 in sectional view of rotor core 110B. Recess 112 is provided on both surfaces of rotor core 110B in the longitudinal direction of shaft 130. Protrusion 310B of first fixing member 31B is fitted into one recess 112, and protrusion 320B of second fixing member 32B is fitted into the other recess 112.

This configuration enables protrusion 310B of first fixing member 31B and protrusion 320B of second fixing member 32B to be increased in width as much as recess 112 is increased in width from the width of third gap 140c, so that protrusion 310B and protrusion 320B can be increased in mechanical strength. This enables securing the holding force of permanent magnet 120 using protrusion 310B and protrusion 320B without greatly reducing the magnetic flux of rotor 10.

(Other Modifications)

The motor and the like according to the present disclosure are described above based on the exemplary embodiment and the modifications. However, the present disclosure is not limited to the exemplary embodiment and the modifications described above.

Figure 13:
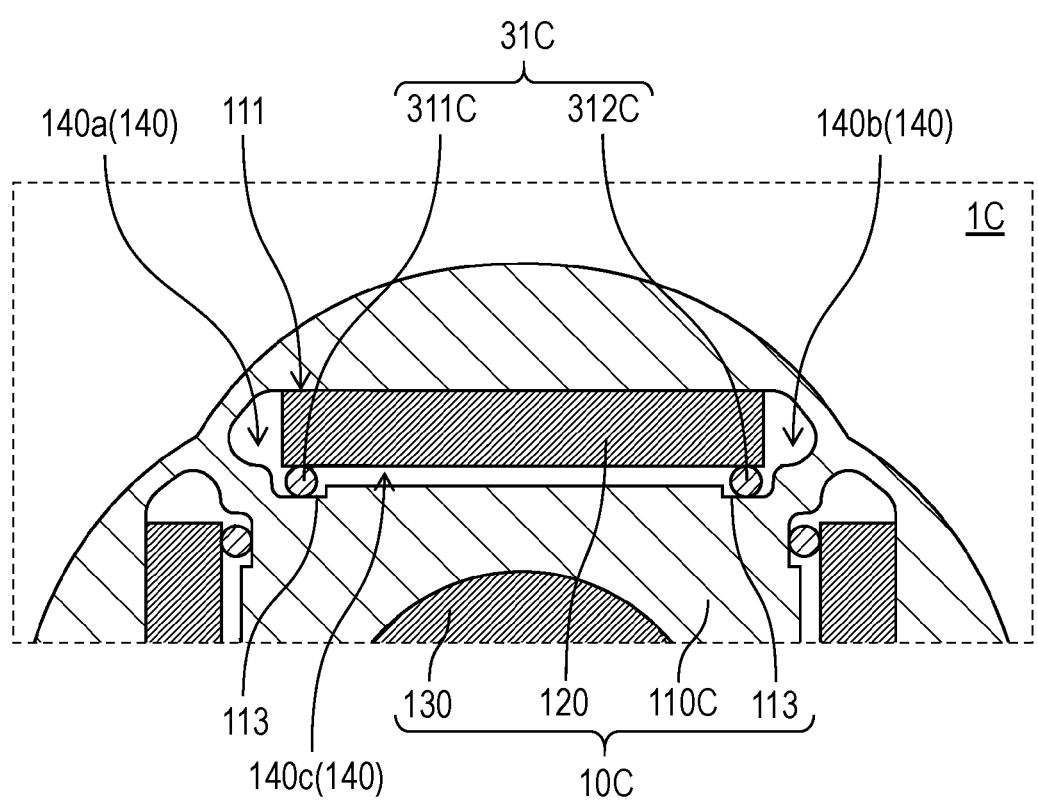
FIG. 13 is a partially enlarged sectional view of a rotor used in a motor according to a third modification.

For example, although motor 1 in the exemplary embodiment described above includes first protrusion 311 of first fixing member 31 that is fitted into first gap 140a, and second protrusion 312 of first fixing member 31 that is fitted into second gap 140b, the present disclosure is not limited thereto. FIG. 13 is a partially enlarged sectional view of rotor 10C used in motor 1C according to a third modification. Specifically, as in rotor 10C in motor 1C illustrated in FIG. 13, both first protrusion 311C and second protrusion 312C may be fitted into third gap 140c by changing positions of first protrusion 311C and second protrusion 312C of first fixing member 31C. In this case, as with the second modification described above, to secure holding force of permanent magnet 120 using first protrusion 311C and second protrusion 312C without greatly decreasing magnetic flux of rotor 10C, third gap 140c is preferably increased partially in width to increase a width of each of first protrusion 311C and second protrusion 312C. Specifically, as illustrated in FIG. 13, recess 113 recessed radially inward in rotor core 110C is preferably formed in rotor core 110C in third gap 140c of magnet insertion hole 111. Although not illustrated, second fixing member has structure similar to that of first fixing member 31C.

Instead of structure as illustrated in FIGS. 5 and 13 in which the protrusions of the first fixing member and the second fixing member are fitted into only one of first gap 140a, second gap 140b, and third gap 140c, the protrusions may be configured to be fitted into both of first gap 140a or second gap 140b, and third gap 140c. That is, the first fixing member and the second fixing member may be increased in number of protrusions such that the number of protrusions to be fitted into both first gap 140a or second gap 140b, and third gap 140c is formed in the first fixing member and the second fixing member. For example, the first fixing member and the second fixing member each may have both the protrusion illustrated in FIG. 5 and the protrusion illustrated in FIG. 13 (or FIG. 11).

Figure 14:
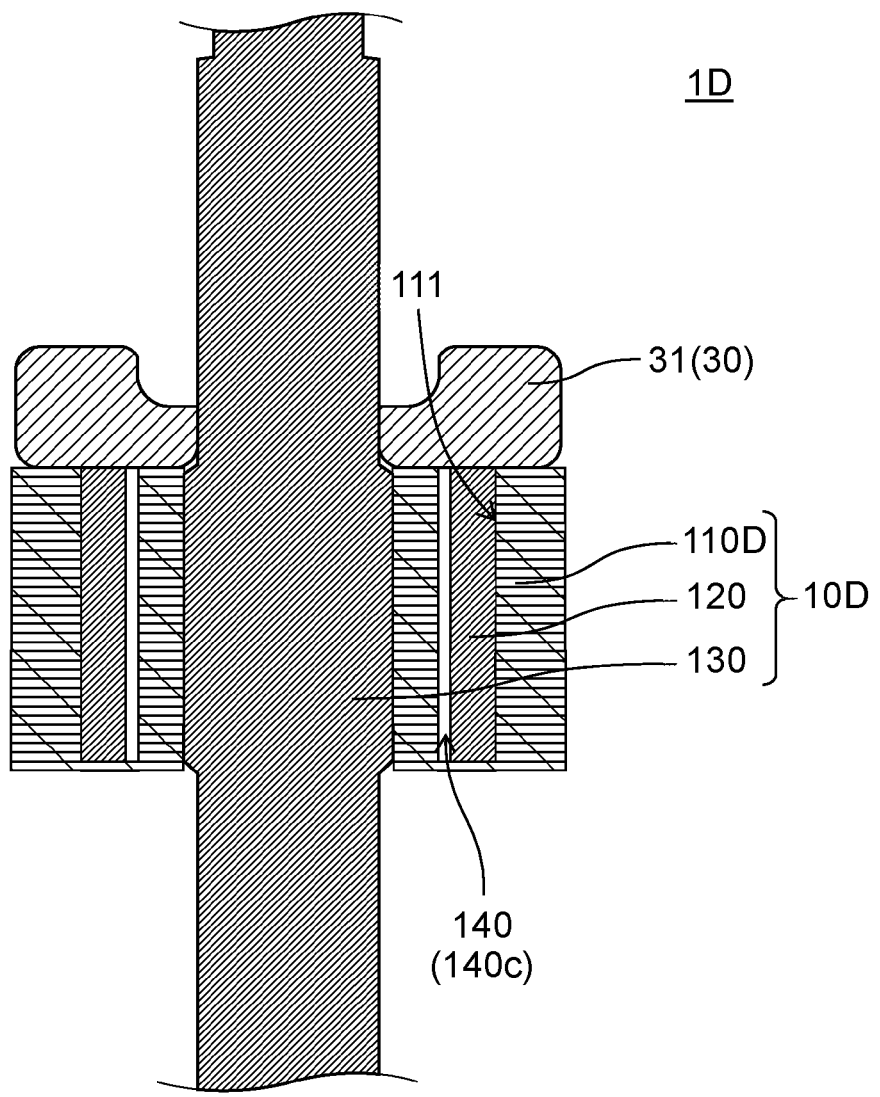
FIG. 14 is a sectional view of a rotor used in a motor according to a fourth modification.

In the exemplary embodiment described above, both first fixing member 31 and second fixing member 32 are used as fixing member 30. However, the present disclosure is not limited thereto, and only one of first fixing member 31 and second fixing member 32 may be used. FIG. 14 is a sectional view of rotor 10D used in motor 1D according to a fourth modification. For example, as in motor 1D illustrated in FIG. 14, only first fixing member 31 may be used. In this case, to prevent permanent magnet 120 from falling off from magnet insertion hole 111 on a side opposite to a side where first fixing member 31 is disposed, at least one (the endmost steel plate in FIG. 14) of multiple steel plates constituting rotor core 110D is preferably formed without magnet insertion hole 111 and the steel plate without magnet insertion hole 111 formed is preferably used as a bottom plate. This allows the steel plate without magnet insertion hole 111 formed to function as a stopper plate, so that permanent magnet 120 can be prevented from falling off from magnet insertion hole 111 even when only first fixing member 31 is used.

Figure 15:
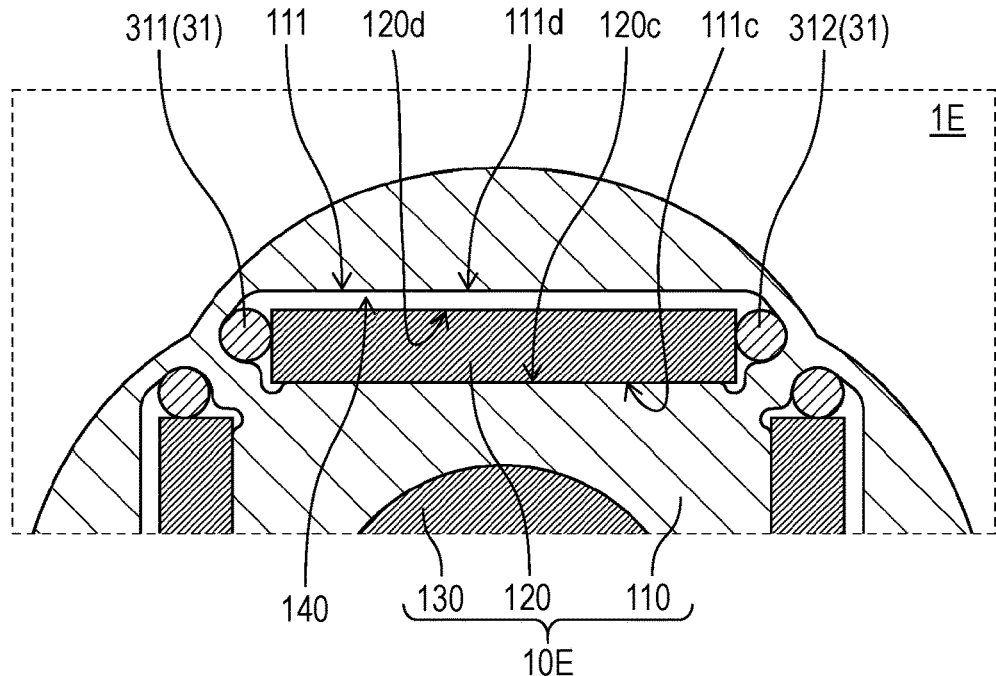
FIG. 15 is a partially enlarged sectional view of a rotor used in a motor according to a fifth modification.

Although in the exemplary embodiment described above, permanent magnet 120 is in contact with the inner surface of magnet insertion hole 111, being located radially outward in rotor core 110, and is not in contact with the inner surface of magnet insertion hole 111, being located radially inward in rotor core 110, the present disclosure is not limited thereto. FIG. 15 is a partially enlarged sectional view of rotor 10E used in motor 1E according to a fifth modification. For example, when permanent magnet 120 is firmly fixed to first fixing member 31 and second fixing member 32, permanent magnet 120 may not be in contact with the inner surface of magnet insertion hole 111, being located radially outward in rotor core 110, and may be in contact with the inner surface of magnet insertion hole 111, being located radially inward in rotor core 110, as in rotor 10E of motor 1E illustrated in FIG. 15. Specifically, FIG. 15 illustrates first magnet main surface 120c of permanent magnet 120 that is in surface contact with first hole main surface 111c of magnet insertion hole 111.

Figure 16:
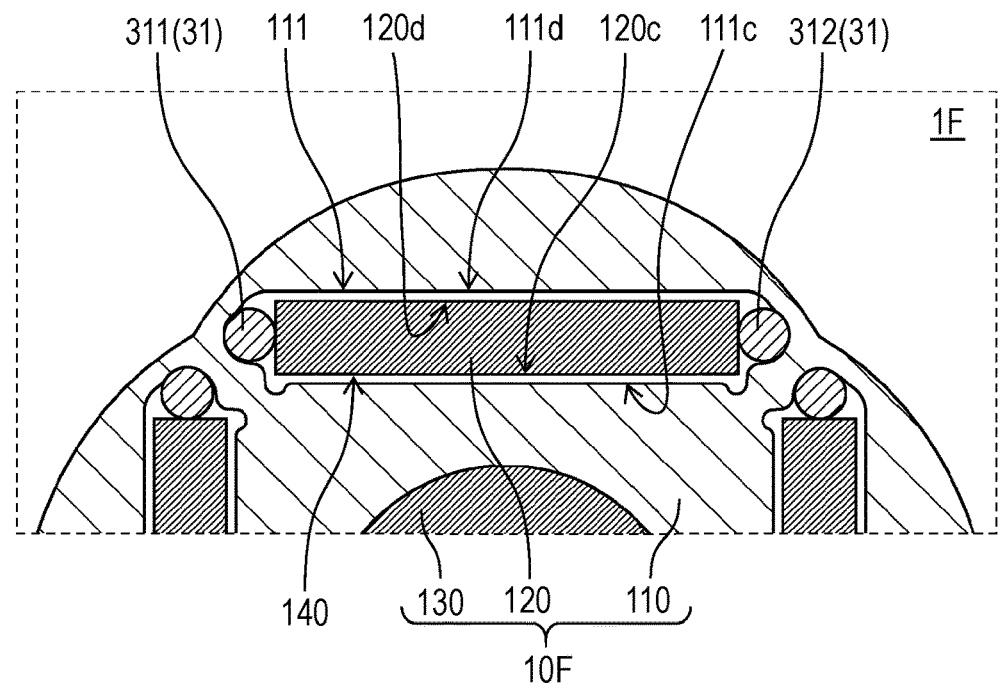
FIG. 16 is a partially enlarged sectional view of a rotor used in a motor according to a sixth modification.

Alternatively, FIG. 16 is a partially enlarged sectional view of rotor 10F used in motor 1F according to a sixth modification. As in rotor 10F of motor 1F illustrated in FIG. 16, permanent magnet 120 may not be in contact with the inner surface of magnet insertion hole 111, being located radially outward in rotor core 110, and may not be in contact with the inner surface of magnet insertion hole 111, being located radially inward in rotor core 110. Specifically, FIG. 16 illustrates first magnet main surface 120c of permanent magnet 120 that is not in contact with first hole main surface 111c of magnet insertion hole 111, and second magnet main surface 120d of permanent magnet 120 that is not in contact with second hole main surface 111d of magnet insertion hole 111. That is, FIG. 16 illustrates permanent magnet 120 that is not in contact with any inner surfaces of magnet insertion hole 111, and gap 140 that exists over the entire circumference of permanent magnet 120.

Although in the exemplary embodiment, first fixing member 31 and second fixing member 32 are each a balance weight, the present disclosure is not limited thereto. For example, first fixing member 31 and second fixing member 32 each may not have a function of a balance weight. In this case, a balance weight may be provided separately from first fixing member 31 and second fixing member 32, or may not be provided. First fixing member 31 and second fixing member 32 each may have a function of fixing permanent magnet 120 using an existing component of the motor other than the balance weight.

Although in the exemplary embodiment described above, first protrusion 311 and second protrusion 312 of first fixing member 31, and first protrusion 321 and second protrusion 322 of second fixing member 32, are each in the shape of a bullet, the present disclosure is not limited thereto. Any shape is applied as long as first protrusion 311 and second protrusion 312 of first fixing member 31, and first protrusion 321 and second protrusion 322 of second fixing member 32, can be fitted into gap 140 between rotor core 110 and permanent magnet 120 in magnet insertion hole 111. First protrusion 311 and second protrusion 312 of first fixing member 31, and first protrusion 321 and second protrusion 322 of second fixing member 32, are each preferably provided with a leading end portion having a tapered surface causing the leading end portions to be tapered. This allows first protrusion 311 and second protrusion 312 of first fixing member 31, and first protrusion 321 and second protrusion 322 of second fixing member 32, to be easily pushed into gap 140.

Although in the exemplary embodiment described above, the number of magnetic poles of rotor 10 is four (i.e., the number of permanent magnets 120 is four), the present disclosure is not limited thereto. For example, any number can be applied as the number of magnetic poles of rotor 10 as long as it is 2n (n is a natural number).

Figure 17:
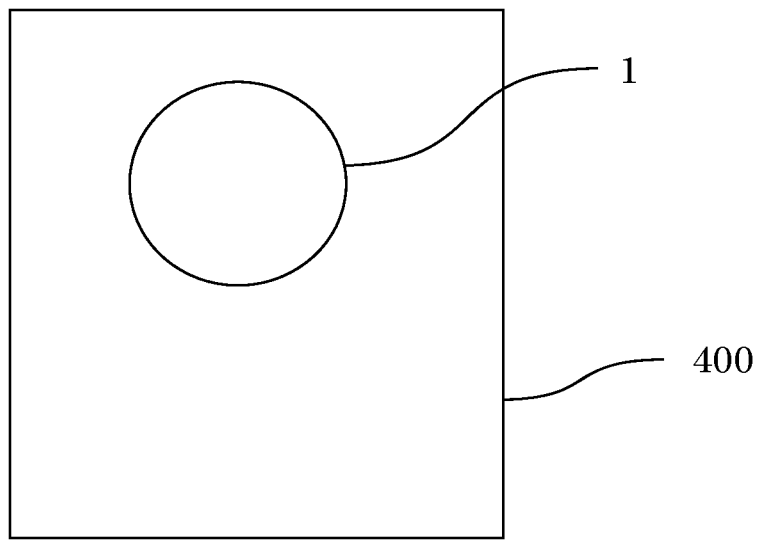
FIG. 17 is a diagram illustrating an electric device including a motor.

Although motor 1 is described in the exemplary embodiment described above when being applied to a fan motor of a vacuum cleaner, the present disclosure is not limited thereto. FIG. 17 is a diagram illustrating electric device 400 including motor 1. For example, the motor of each of the exemplary embodiment and the various modifications described above can be used for various electric devices such as household electric devices other than a vacuum cleaner, such as an air conditioner and a refrigerator, or industrial electric devices such as an automobile device and a robot.

INDUSTRIAL APPLICABILITY

The technology of the present disclosure can be widely used for a motor, an electric device including the motor, and the like.

The invention claimed is:

1. A motor comprising:
a rotor including a rotor core provided with a magnet insertion hole and a permanent magnet disposed in the magnet insertion hole, the rotor rotating about an axis of the rotor;
a stator facing the rotor; and
a fixing member fixing the permanent magnet in the magnet insertion hole, the fixing member including a protrusion fitted in a gap between the rotor core and the permanent magnet wherein:
the permanent magnet has a plate shape, and includes:
a first magnet side surface on one side in a width direction of the permanent magnet;
a second magnet side surface on another side in the width direction of the permanent magnet;
a first magnet main surface on one side in a thickness direction of the permanent magnet; and
a second magnet main surface on another side in the thickness direction of the permanent magnet,
the magnet insertion hole has surfaces serving as inner surfaces of the rotor core, the surfaces including:
a first hole main surface located inward in a radial direction intersecting the axis of the rotor core;
a first hole side surface on one lateral side of the magnet insertion hole;
a second hole side surface on another lateral side of the magnet insertion hole; and
a second hole main surface located outward in the radial direction intersecting the axis of the rotor core,
the permanent magnet is disposed in the magnet insertion hole while the first magnet main surface is located inward of the second magnet main surface in the radial direction of the rotor core,
when the rotor is viewed from the direction in which the axis extends, the gap includes:
a first gap between the first magnet side surface and the first hole side surface;
a second gap between the second magnet side surface and the second hole side surface; and
a third gap between the first magnet main surface and the first hole main surface, and
the first protrusion is fitted into the first gap and the second protrusion is fitted into the second gap to fix the permanent magnet to the core.

2. The motor according to claim 1, wherein,
the permanent magnet is in contact with an inner surface of the magnet insertion hole, the inner surface being located outward, of inner surfaces included in the magnet insertion hole, when viewed from a direction in which the axis extends.

3. The motor according to claim 1, wherein
the fixing member is a balance weight.

4. The motor according to claim 1, wherein
the first gap and the second gap are each a flux barrier.

5. The motor according to claim 1, wherein
the fixing member includes, as the protrusion, a first protrusion fitted in the first gap and a second protrusion fitted in the second gap.

6. The motor according to claim 5, wherein
the permanent magnet has a trapezoidal shape when the rotor is viewed from the direction in which the axis extends, and
a side corresponding to the first magnet main surface is shorter than a side corresponding to the second magnet main surface.

7. The motor according to claim 1, wherein the protrusion is fitted in the third gap.

8. The motor according to claim 7, wherein
the rotor core is provided with a recess that is recessed stepwise from an opening surface of the magnet insertion hole as a part of the third gap, and the protrusion is fitted in the recess.

9. The motor according to claim 7, wherein
the third gap and the protrusion each have an elongated shape along the first magnet main surface of the permanent magnet when the rotor is viewed from the direction in which the rotor extends.

10. The motor according to claim 1, wherein
the rotor includes a shaft that passes through the rotor core,
the fixing member is provided with a through-hole through which the shaft passes, and
the fixing member faces a surface of the shaft in an axial direction of the shaft.

11. The motor according to claim 1, wherein
the motor includes, as the fixing member, a first fixing member facing one surface in the axial direction of the shaft and a second fixing member facing another surface in the axial direction of the shaft.

12. The motor according to claim 1, wherein
the magnet insertion hole is one of multiple magnet insertion holes provided along a circumferential direction of the rotor core,
the permanent magnet is one of multiple permanent magnets that are disposed in the respective magnet insertion holes, and
the protrusion is one of multiple protrusions that are provided corresponding to the respective multiple permanent magnets.

13. The motor according to claim 1, wherein
the fixing member is made of a non-magnetic material.

14. The motor according to claim 13, wherein
the non-magnetic material is a thermoplastic resin.

15. The motor according to claim 1, wherein
the rotor core and the permanent magnet are harder than the protrusion.

16. An electric device comprising:
a motor comprising:
  a rotor including a rotor core provided with a magnet insertion hole and a permanent magnet disposed in the magnet insertion hole, the rotor rotating about an axis of the rotor;
  a stator facing the rotor; and
  a fixing member fixing the permanent magnet in the magnet insertion hole, the fixing member including a protrusion fitted in a gap between the rotor core and the permanent magnet, wherein:
the permanent magnet has a plate shape, and includes:
  a first magnet side surface on one side in a width direction of the permanent magnet;
  a second magnet side surface on another side in the width direction of the permanent magnet;
  a first magnet main surface on one side in a thickness direction of the permanent magnet; and
  a second magnet main surface on another side in the thickness direction of the permanent magnet,
the magnet insertion hole has surfaces serving as inner surfaces of the rotor core, the surfaces including:
  a first hole main surface located inward in a radial direction intersecting the axis of the rotor core;
  a first hole side surface on one lateral side of the magnet insertion hole;
  a second hole side surface on another lateral side of the magnet insertion hole; and
  a second hole main surface located outward in the radial direction intersecting the axis of the rotor core,
the permanent magnet is disposed in the magnet insertion hole while the first magnet main surface is located inward of the second magnet main surface in the radial direction of the rotor core,
when the rotor is viewed from the direction in which the axis extends, the gap includes:
  a first gap between the first magnet side surface and the first hole side surface;
  a second gap between the second magnet side surface and the second hole side surface; and
  a third gap between the first magnet main surface and the first hole main surface, and
the first protrusion is fitted into the first gap and the second protrusion is fitted into the second gap to fix the permanent magnet to the core.

17. The electric device according to claim 16, wherein the electric device is one of a vacuum cleaner, an air conditioner, a refrigerator, an automobile device or a robot.

18. The motor according to claim 1, wherein the third gap is provided over an entirety of the first hole main surface and has a constant width.

19. The electric device according to claim 16, wherein the third gap is provided over an entirety of the first hole main surface and has a constant width.

* * * * *